United States Patent
Kim et al.

(12)

(10) Patent No.: US 6,580,832 B1
(45) Date of Patent: Jun. 17, 2003

(54) APPARATUS AND METHOD FOR CODING/ DECODING SCALABLE SHAPE BINARY IMAGE, USING MODE OF LOWER AND CURRENT LAYERS

(75) Inventors: Jae-Kyoon Kim, Taejon-si (KR); Jin-Hak Lee, Taejon-si (KR); Joo-Hee Moon, Seoul (KR); Sung-Moon Chun, Kyoungki-do (KR); Hae-Kwang Kim, Seoul (KR)

(73) Assignee: Hyundai Curitel, Inc. (KR)

( * ) Notice: Subject to any disclaimer, the term of this patent is extended or adjusted under 35 U.S.C. 154(b) by 0 days.

(21) Appl. No.: 09/903,060

(22) Filed: Jul. 11, 2001

Related U.S. Application Data

(62) Division of application No. 09/113,008, filed on Jul. 9, 1998, now Pat. No. 6,351,563.

(30) Foreign Application Priority Data

| Jul. 2, 1997 | (KR) | ............................................. 97-31815 |
| Jul. 14, 1997 | (KR) | ............................................. 97-32644 |
| Aug. 13, 1997 | (KR) | ............................................. 97-38735 |
| Aug. 14, 1997 | (KR) | ............................................. 97-38946 |
| Mar. 19, 1998 | (KR) | ............................................. 98-09479 |

(51) Int. Cl.$^7$ ................................................. G06K 9/36
(52) U.S. Cl. ....................................................... 382/243
(58) Field of Search ............................... 382/232, 233, 382/236, 238, 239, 240, 244, 246, 248, 250, 251, 253; 358/384.1, 394.1, 395.1, 400.1, 401.1–404.1, 407.1–416.1, 420.1, 421.1, 425.1, 425.4, 430.1, 431.1, 699

(56) References Cited

U.S. PATENT DOCUMENTS

| 4,546,386 A | * | 10/1985 | Matsumoto et al. | ........ 348/408 |
| 4,849,812 A | * | 7/1989 | Borgers et al. | ............. 348/415 |
| 5,091,782 A | * | 2/1992 | Krause et al. | ............... 348/416 |
| 5,146,325 A | * | 9/1992 | Ng | ............................. 348/409 |
| 5,175,618 A | * | 12/1992 | Ueda et al. | .................. 348/416 |
| 5,253,056 A | * | 10/1993 | Purl et al. | .................... 348/404 |
| 5,317,397 A | * | 5/1994 | Odaka et al. | ................ 348/416 |
| 5,414,469 A | * | 5/1995 | Gonzales et al. | ........... 348/408 |
| 5,428,693 A | * | 6/1995 | Murakami et al. | .......... 382/232 |
| 5,481,553 A | * | 1/1996 | Suzuki et al. | ............... 371/49.1 |
| 5,694,170 A | * | 12/1997 | Tiwari et al. | ................ 348/390 |
| 5,732,155 A | * | 3/1998 | Saito | .......................... 382/232 |
| 5,956,088 A | * | 9/1999 | Shen et al. | .................. 348/385 |
| 5,963,222 A | * | 10/1999 | Cheney et al. | .............. 345/516 |
| 5,995,150 A | * | 11/1999 | Hsieh et al. | ................. 348/409 |
| 6,031,575 A | * | 2/2000 | Suzuki et al. | ............... 348/411 |
| 6,037,985 A | * | 3/2000 | Wong | .......................... 348/405 |
| 6,043,838 A | * | 3/2000 | Chen | ........................... 348/42 |
| 6,351,563 B1 | * | 2/2002 | Kim et al. | ................... 382/232 |

* cited by examiner

*Primary Examiner*—Jose L. Couso
(74) *Attorney, Agent, or Firm*—Blakely Sokoloff Taylor & Zafman

(57) ABSTRACT

All macro blocks (MB) decided as an "all_0", "all_255" or "intra predicted" mode are transmitted as an "intra not coded" mode. A receiving terminal also separates "all_0", "all_255" and "intra predicted" from the "intra not coded" mode, referring to pixels of a lower layer. "Inter coded && MVD=0" and "Inter coded && MVD!=0" modes are represented as "Inter coded", and "Inter not coded && MVD= 0" and "Inter not coded && MVD!=0" modes are represented as "Inter not coded". As its result, coding modes on an I-picture can be reduced to two modes and coding modes on a P-picture, or a B-picture, can be lessened to four modes.

22 Claims, 16 Drawing Sheets

FIG. 3
(PRIOR ART)

(a) HORIZONTAL SCANNING

| C0 | C1 | C2 |
|----|----|----|
| C3 | X  | // |
| C4 | C5 | C6 |

(b) VERTICAL SCANNING

| C0 | C1 | C2 |
|----|----|----|
| // | // | // |
| C4 | Y  | C4 |
| // | // | // |
| C5 | // | C6 |

FIG. 10
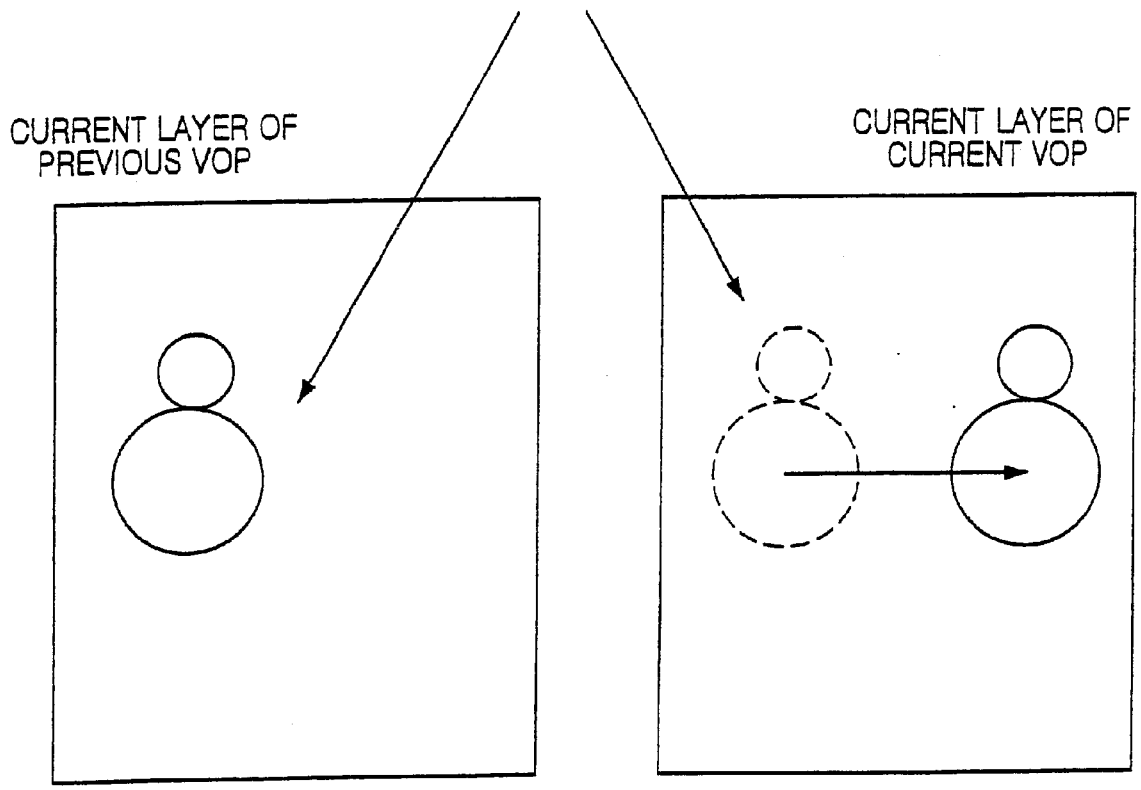
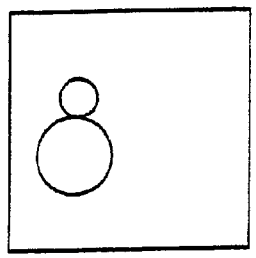
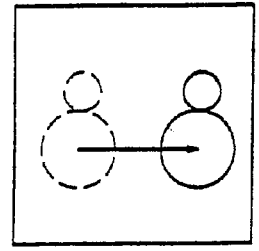

APPARATUS AND METHOD FOR CODING/DECODING SCALABLE SHAPE BINARY IMAGE, USING MODE OF LOWER AND CURRENT LAYERS

This application is a Divisional of U.S. patent application Ser. No. 09/113,008 now U.S. Pat. No. 6,351,563 filed Jul. 9, 1998.

BACKGROUND OF THE INVENTION

1. Field of the Invention

The present invention relates to a coding and decoding of binary images, and more particularly, to a method for coding and decoding scalable binary images by using modes of lower and current layers, which is capable of reducing coding modes of the binary images by considering a correlation between the lower and current layers and lessening a coding bit quantity by assigning mode coding bits according to its correlation.

2. Discussion of Related Art

The scalable shape coding has a function capable of transmitting a plurality of layers having different resolution from each other, a base layer and an enhancement layer, and decoding it. In transmitting information having a multiple of different resolutions, more information should be transmitted than in a general coding method.

In order to reduce the quantity of transmission information, a method for estimating an enhancement layer of the high resolution is applied thereto by utilizing a base layer of the lower resolution as shown in FIG. 1.

In executing the scalable shape coding for binary image information through a use of plural layers, an effective coding may be also done by employing the base layer like the aforesaid or using, on the enhancement layer, the lower layers in case several layers are constructed.

FIG. 1 shows a scalable shape coding method for general image information.

It is herewith represented only one step on an enhancement layer but the enhancement layer of several steps is generally included therein. Thus, a lower layer placed right under a current layer may be a base layer or one layer out of enhancement layers. The scalable shape coding method for binary image information has the same structure as a general scalable shape coding method.

In order to code an enhancement layer for a binary image, in case it is the enhancement layer for an intra-picture, the enhancement layer is coded by predicting its just lower layer as shown in FIG. 1. In coding a predicted-picture of the enhancement layer, the coding is performed by predicting from, both of an image of the just lower layer and a previous image.

In a coding process of image information, a coding of a block unit, namely a size of 16×16, is done. In coding blocks for the binary image information, namely macro blocks (hereinafter, referred to as 'MB'), an intra MB on an I-picture or a P-picture on the enhancement layer is coded by using a scan interleaving method presented on VM(Verification Model) 7.0 of the ISO/IED WG11, wherein the MB should be coded by using only its own lower layer, not using a prediction on a previous image. Its exceptional MBs are coded by using a context-based arithmetic encoding (CAE) method as a coding method of a base layer.

FIG. 2 provides a scan interleaving method.

In order to code an enhancement layer on a base layer, values of two pixels adjacent to each other on the lower and top sides are used. If two adjacent pixel values are same, there is much possibility that a pixel at a current position has the same value. Therefore, in case the two adjacent pixel values are same and the current pixel has a value same as the two adjacent pixel value, a coding is not necessary.

In case two pixel values are different from, the pixel value at the current position should be coded and such a case is said a transitional sample data (TSD). In case that the two adjacent pixel values are same but the pixel of current position has not the same value, the coding should be also done. Such a case is said an exceptional sample data (ESD). Namely, in order to code the enhancement layers by using the scan interleaving method, two kinds of data, TSD and ESD, should be coded.

To code the TSD and ESD in coding by using the scan interleaving method, information for an existence or non-existence of the ESD is first transmitted, and an applicable range of the scan interleaving is different according to an MB having the ESD and an MB not having the ESD.

FIGS. 3(a) and 3(b) provide contexts used in the CAE method.

As shown in FIG. 3(a), a context index Context_ID is decided according to a position of a context made up of neighboring pixels surrounding a coding pixel X. In order to transmit information for X and Y positions, a coding is performed by employing an arithmetic coding table previously decided according to the occurring frequency number of a context index Context_ID type which is constructed with C0 to C6.

Like this, the MB not used in the scan interleaving method is coded by utilizing a method such as a coding of the base layer, e.g., the CAE method. An inter MB on a P-picture of the enhancement, among them is coded by predicting from a previous image by using a motion vector.

In another case, namely, in case all pixels within an MB have a value of '0' or a value of '255', only additional information, mode information such as "all pixels are '0'" or "all pixels are '255'", is transmitted without coding. Since the coding image herewith is the binary image, each of the pixels may have only two values as '0' or '255'. In general, '0' indicates a background and '255' represents an object.

That is to say, in order to encode the binary images, a coding method is differently decided according to each MB, and the additional information, namely the mode information such as what coding method was used for a coding of each MB, should be transmitted. At this time, it is needed a sort for the additional information and a table for codes of the additional information, the codes being a first shape code.

The construction of the existing additional information indicating the modes for the enhancement layer of the I-picture, P-picture and B-picture is as follows.

Modes of Enhancement Layer on I-picture 1) all_0: all pixels within MB becomes a background ("0")
2) all_255: all pixels within MB becomes an object ("255")
3) intra coded: If ESD (Exceptional sample data) exists, all pixels within MB are coded by using the scan interleaving method. If the ESD does not exist, only TSD (Transitional sample data) is coded by the scan interleaving method.

Modes of Enhancement Layer on P-picture or B-picture 1) all_0: the same case as the above-mentioned
2) all_255: the same case as the above-mentioned 3) Intra coded: the same case as the above-mentioned
4) Intra not coded
5) Inter coded && MVD=0
6) Inter not coded && MVD=0
7) Inter coded && MVD!=0
8) Inter not coded && MVD!=0

Data coded as the above is decoded as follows. The additional information indicating the modes is represented at the first position of a bitstream in each MB of the binary image. The mode information is first read on the bitstream in order to decode each of the MBs.

There is constructed a coding table for transmitting the existing additional information for the enhancement layer of the P-picture and B-picture. In such construction, in order to lessen the number of bits, the coding table is made by predicting from a lower layer or a previous image. In its construction method, the coding table is constructed by a case that a corresponding MB of just lower layer is "all_0" or "all_255", and by its exceptional cases.

In case a mode for the corresponding MB of the just lower layer is not "all_0" and "all_255", the coding table is constructed by a mode of a corresponding MB on the same layer of a just previous image.

Case that the Mode of Corresponding MB for Just Lower Layer is "all_0"

| Mode | Code |
| --- | --- |
| (1) | 0111 |
| (2) | 0110001 |
| (3) | 0110000 |
| (4) | 010 |
| (5) | 00 |
| (6) | 01101 |
| (7) | 011001 |
| (8) | 1 |

Case That the Mode of Corresponding MB for the Just Lower Layer is "all_255"

| Mode | Code |
| --- | --- |
| (1) | 1' |
| (2) | 0010100 |
| (3) | 000 |
| (4) | 0010101 |
| (5) | 0011 |
| (6) | 001011 |
| (7) | 00100 |
| (8) | 01 |

In the existing additional information indicating the modes for the enhancement layer per each MB, the I-picture has three sorts as all_0, all_255 and intra coded, and the P-picture has eight sorts as all_0, all_255, intra coded, intra not coded, inter coded && MVD=0, inter not coded && MVD=0, inter coded && MVD!=0, and inter not coded && MVD!=0. If the sorts of additional information are many, the number of bits representing the respective modes becomes many, thus it means that the quantity of transmission bits is many.

FIG. 4 explains a relation between a current layer and a lower layer. Images on the current and lower layers may be same in its size. In case the size of images are different from each other, all horizontally and vertically may be different from or it may be different in only one direction. FIG. 4 shows a case different in only horizontal direction. Even though the size of images is different from, the size of each MB on all layers is constant as 16×16. Thus, in case that an image of the current layer is bigger than that of the lower layer, MBs of the current layer are included inside an MB of the lower layer, since several MBs of the current layer correspond to one MB of the lower layer. That is, an image of the current layer is down sampled and then constitutes an image of the lower layer.

As shown in FIG. 4, a size of the current layer is twice of the lower layer and an MB of the current layer corresponds to a half size of the lower layer MB in this case, the half size being a part of oblique lines in FIG. 4.

SUMMARY OF THE INVENTION

Accordingly, the present invention is directed to a method for coding and decoding scalable binary images that substantially obviates one or more of the limitations and disadvantages of the related art.

An object of the present invention is to provide a method for coding and decoding scalable binary images, using modes of current and lower layers, which is capable of improving a coding efficiency by reducing a sort of additional information representing coding methods.

Another object of the present invention is to provide a method for coding and decoding scalable binary images with modes of current and lower layers, which is capable of lessening coding modes of binary images by considering a correlation between the lower layer and the current layer and reducing the quantity of coding bits by assigning mode coding bits according to its correlation.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, only one mode, an "intra not coded", instead of three modes as an "all_0", an "all_255" and an "intra not coded" is used. A transmitting terminal transmits all MBs decided as "all_0", "all_255" or "intra predicted" mode, by the "intra not coded" mode. A receiving terminal discriminates "all_0", "all_255" and "intra predicted" from the "intra not coded" mode referring to pixels of the lower layer.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 represents a general scalable shape coding method on image information.

FIG. 2 presents a scan interleaving method.

FIGS. 3(a) and 3(b) set forth contexts used for a context-based arithmetic encoding method.

FIG. 4 depicts an explanatory diagram showing a relation between a current layer and a lower layer in a spatial scalability.

FIG. 5 offers a flow chart providing a method for coding an enhancement layer of an I-picture in accordance with the present invention.

Figure 9:
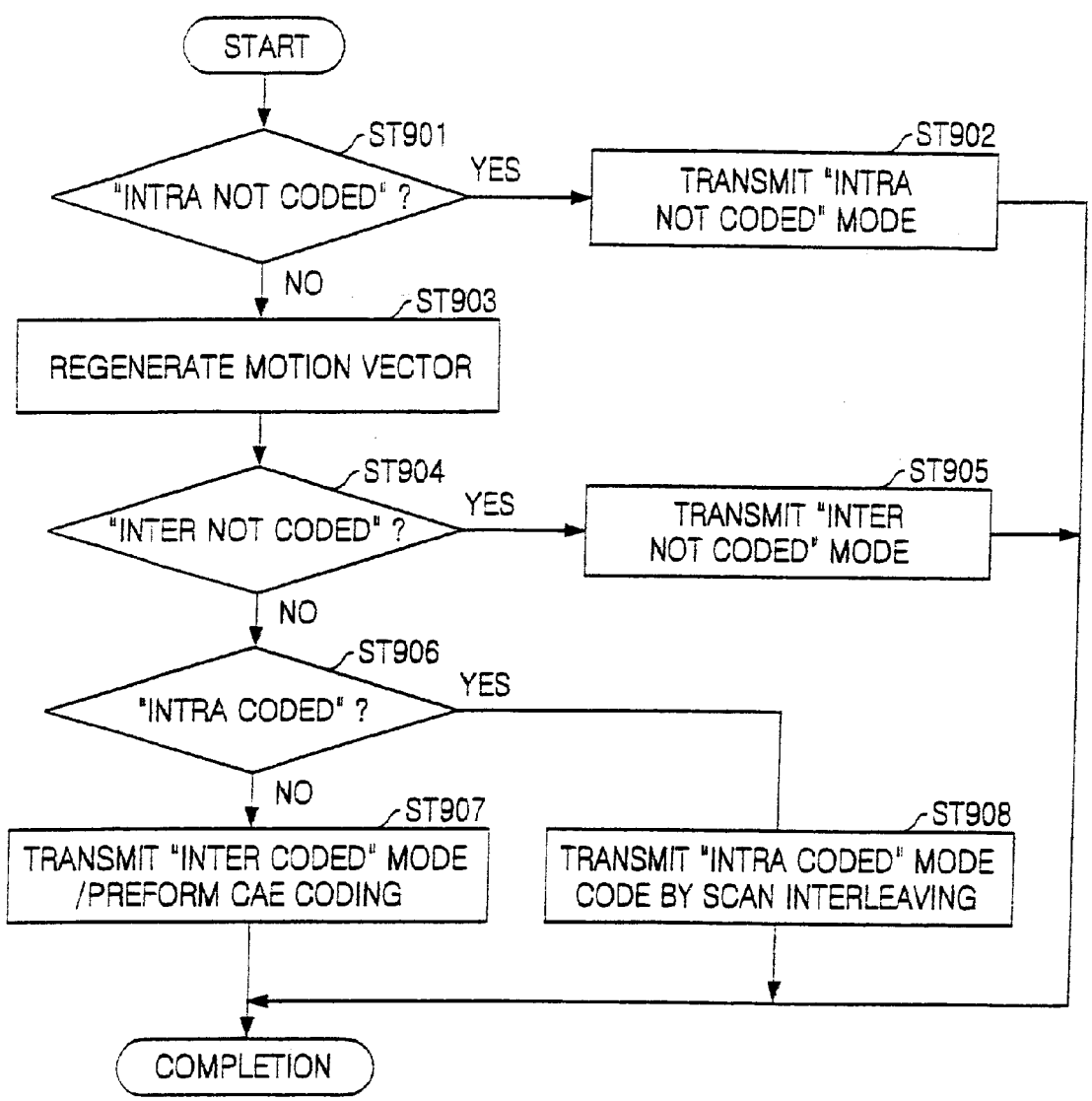

FIG. 9 presents a flow chart for coding a P-image and a B-image of an enhancement layer in the invention.

FIG. 10 provides a method for adjusting a motion vector of a base layer according to a ratio of an image size between the base layer and a current layer.

Figure 11:
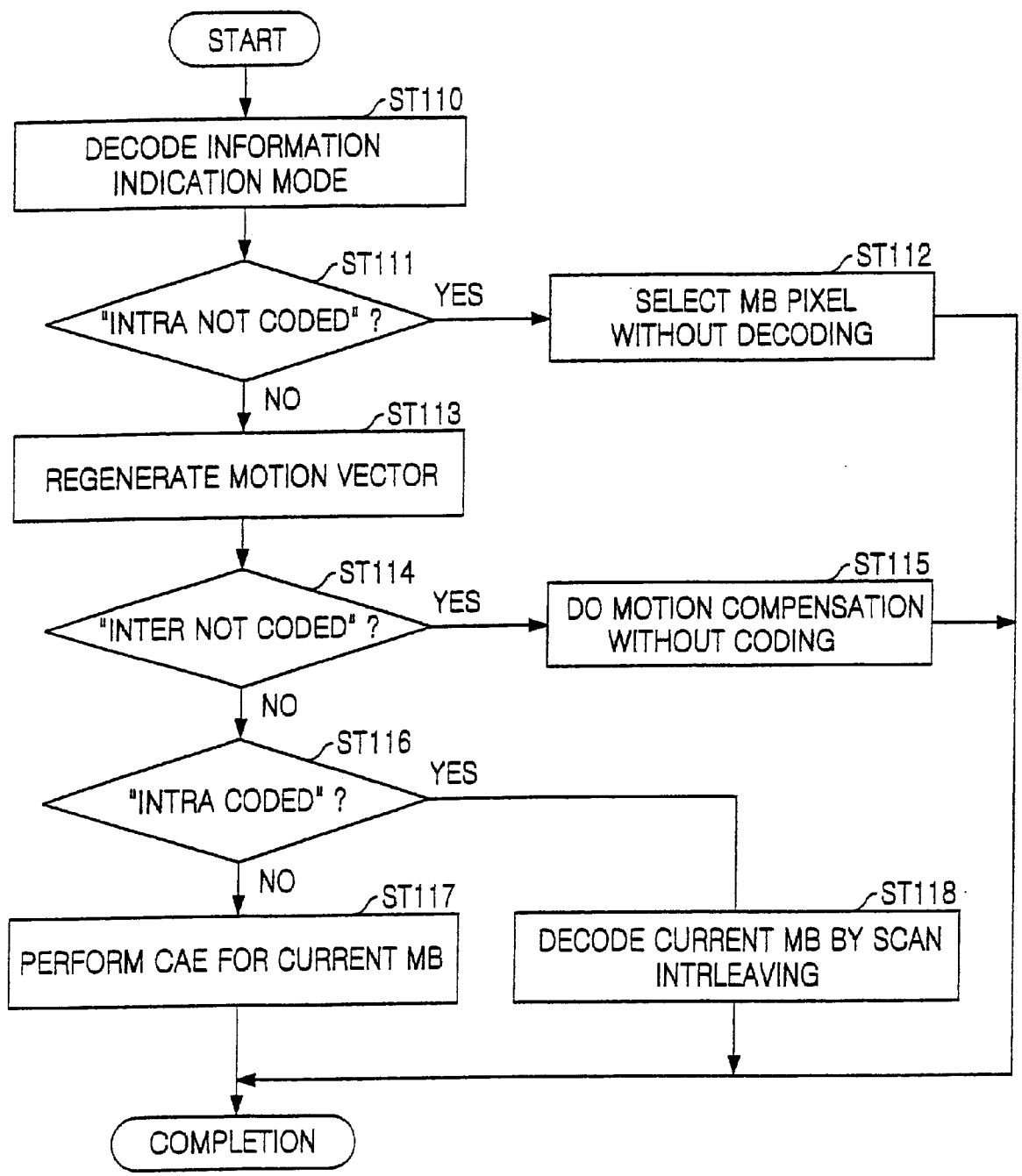

FIG. 11 is a flow chart presented in decoding the P-image or B-image of the enhancement layer in the present invention.

Figure 12:
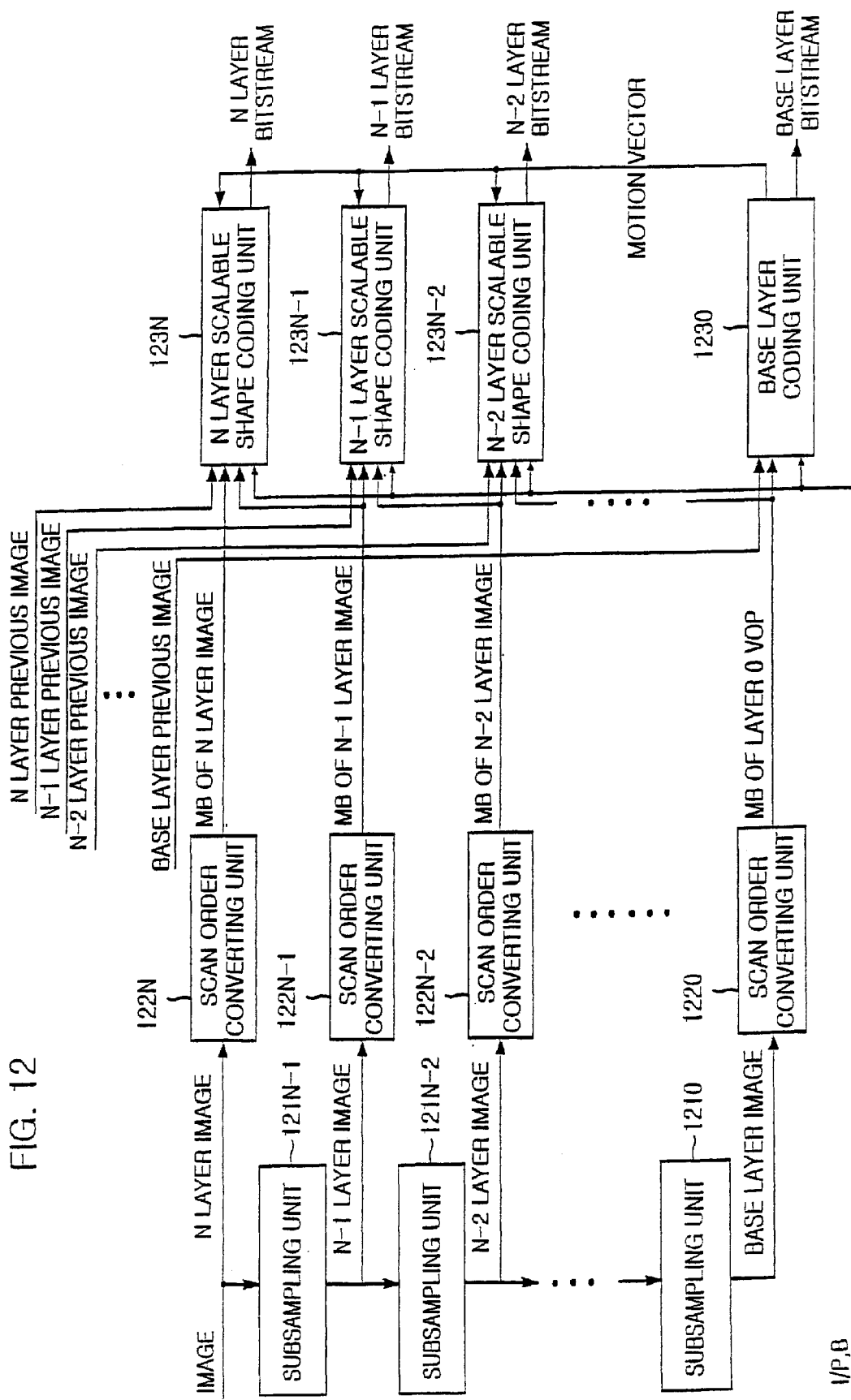

FIG. 12 shows a block diagram with the construction of an inventive scalable shape coding apparatus.

Figure 13:
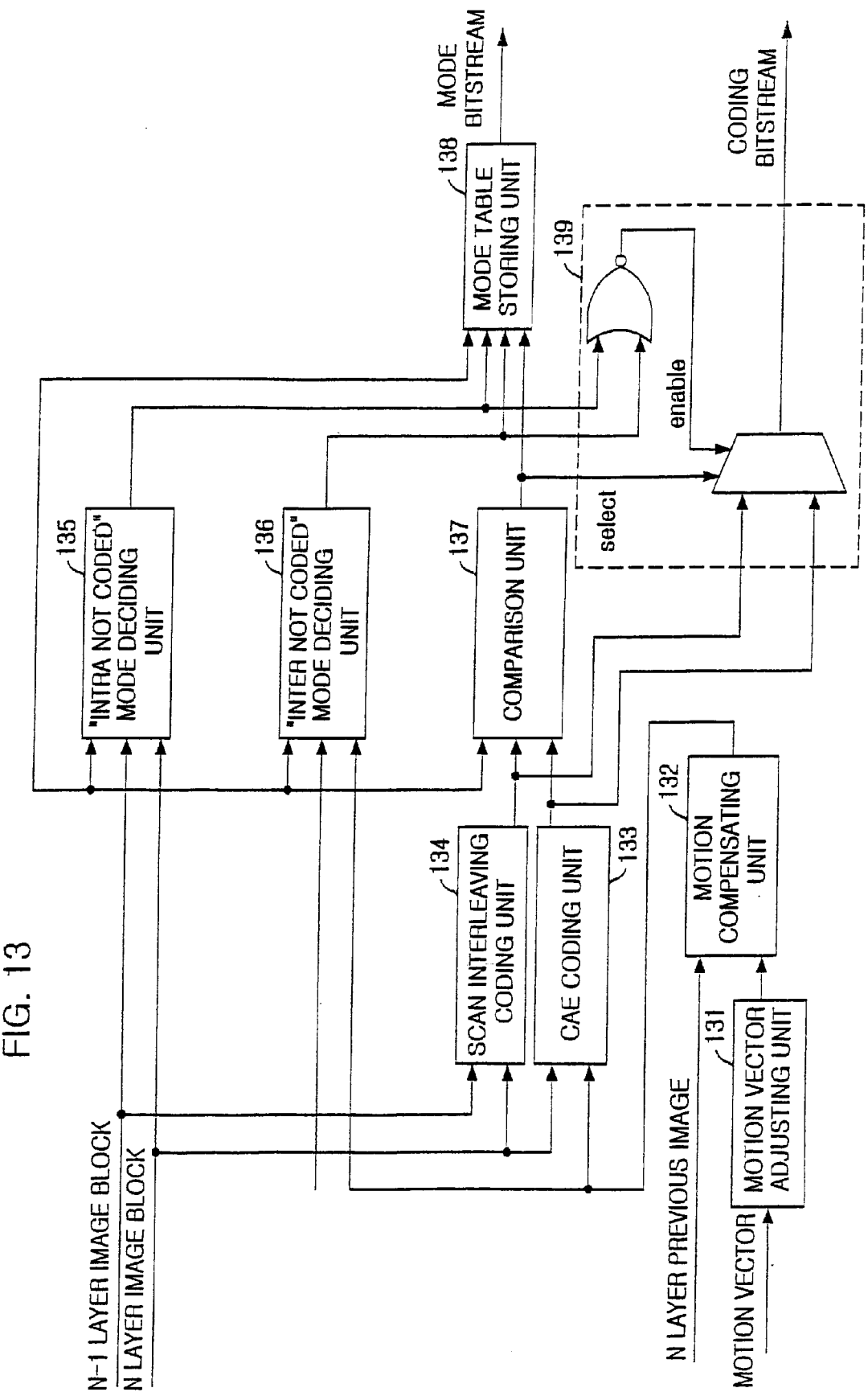

FIG. 13 gives a block diagram for one preferred embodiment of an inventive scalable shape coding unit.

Figure 14:
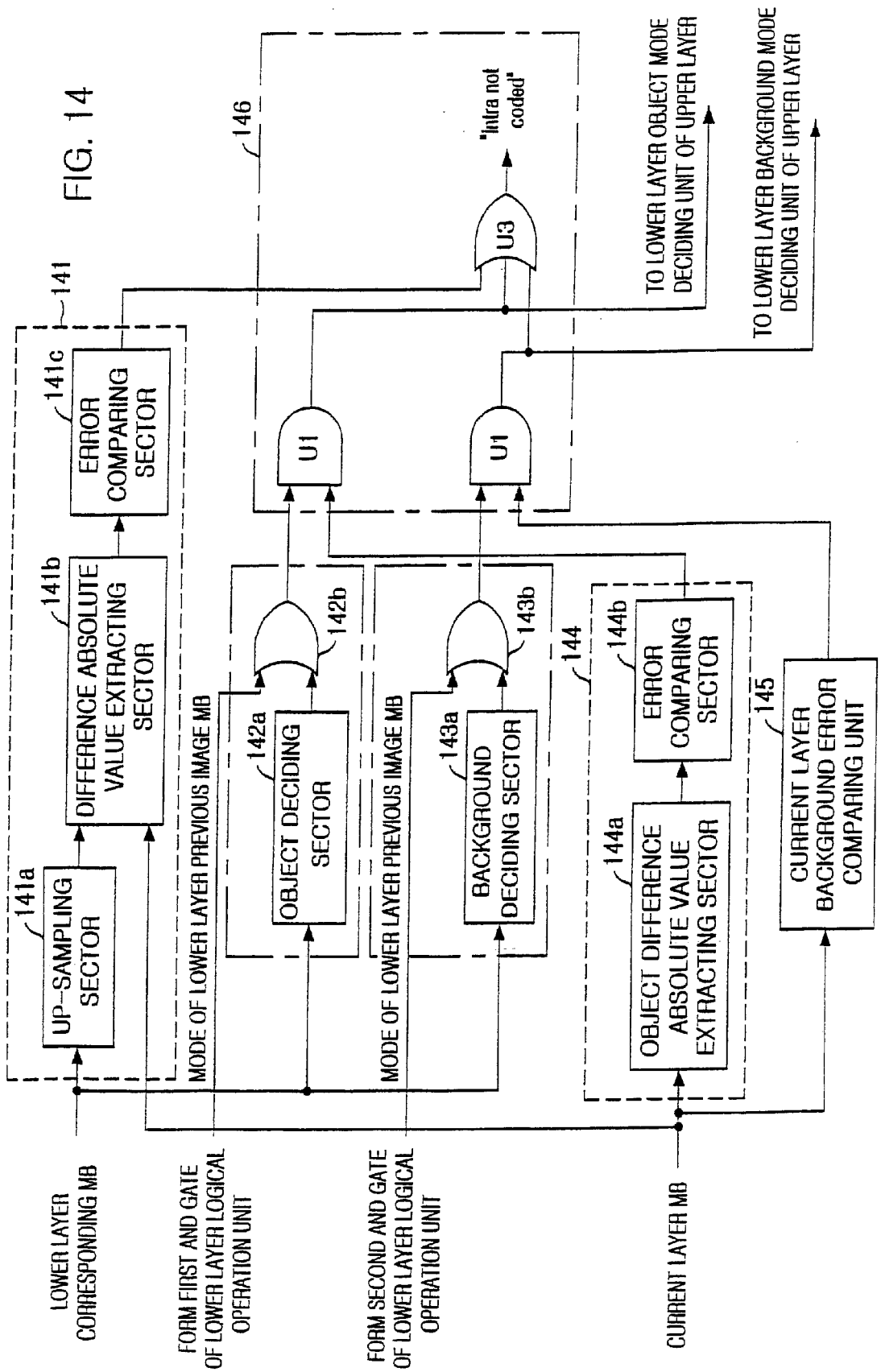

FIG. 14 furnishes a block diagram showing the construction of an inventive "intra not coded" mode deciding unit.

Figure 15:
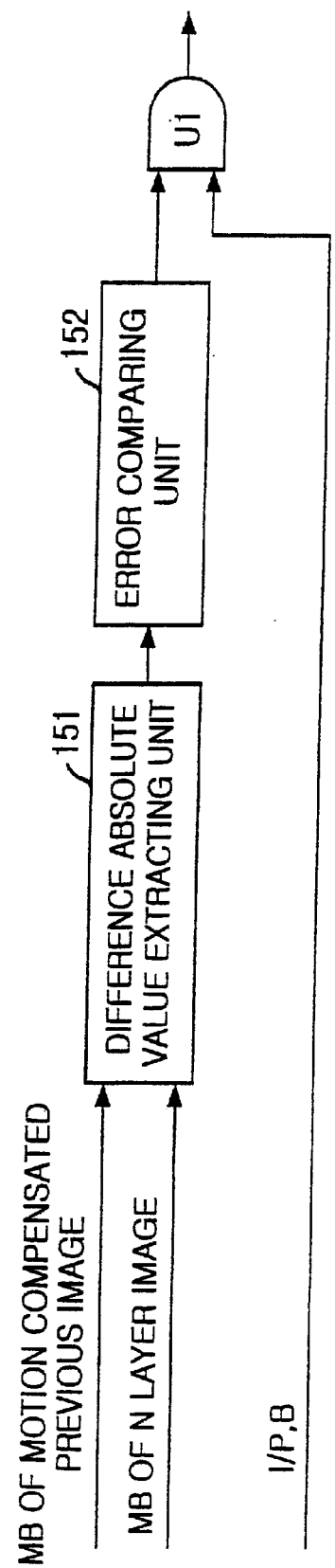

FIG. 15 offers a block diagram showing the construction of an inventive "inter not coded" mode deciding unit.

Figure 16:
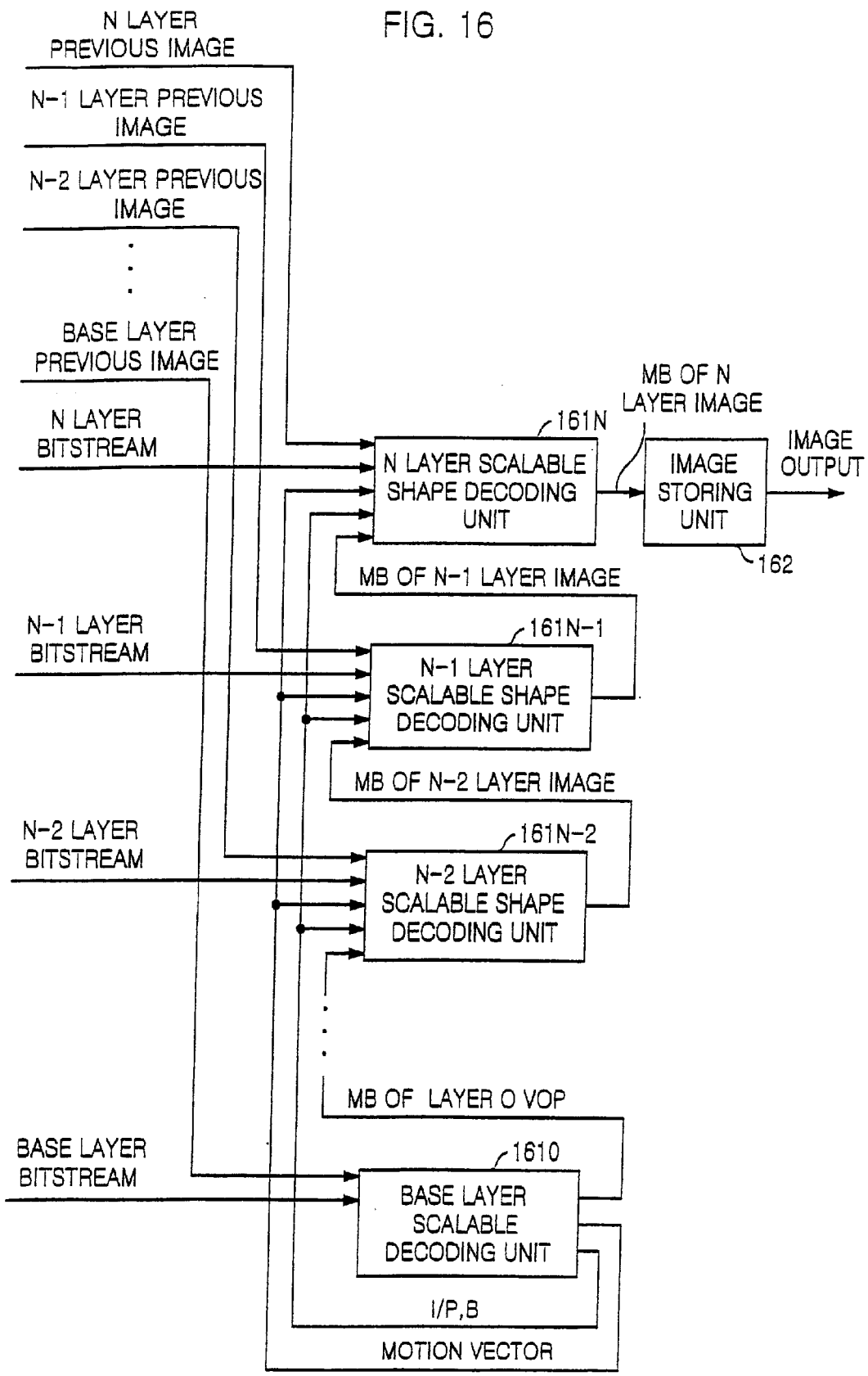

FIG. 16 is a block diagram providing the construction of a scalable shape decoding apparatus in the invention.

DETAILED DESCRIPTION OF PREFERRED EMBODIMENT

Reference will now be made in detail to the preferred embodiments of the present invention, examples of which are illustrated in the accompanying drawings.

In a coding mode for an enhancement layer of an I-picture, e.g., an VOP, a frame, a 16×16 macro block, etc., three modes of "all_0", "all_255" and "intra not coded" among modes of a conventional system are represented as only one mode "intra not coded", the coding mode for the enhancement layer of the I-picture thus has two modes as the following.

(1) "Intra Not Coded"
(2) "Intra Coded"

First, in case that the coding mode is "intra coded", in a first process, information for an existence or non-existence of ESD is transmitted. In a second process, then, when the ESD exists, a CAE for all MBs is performed, when the ESD does not exist, the CAE for only TSD is executed.

Next, in case the coding mode is "intra not coded", there are provided three following cases.

That is to say, in a first case, there is a case that an MB of the lower layer is "all_0" and an MB of the enhancement layer also is "all_0", or a case that the total number of pixels within one MB having a difference from that of an enhancement layer MB is under a reference value when the MB of the enhancement layer is "all_0".

In a second case, there is a case that the MB of the lower layer is "all_255" and the MB of the enhancement layer also is "all_255", or a case that the total number of pixels within one MB having a difference from that of the enhancement layer MB is under a reference value when the MB of the enhancement layer is "all_255".

In a third case, there is presented a case that the total number of pixels within one MB having a difference from that of the enhancement layer MB is under a reference value, when a prediction from an MB of the lower layer is executed in case that the MB of the lower layer is not "all_0" and "all_255".

Accordingly, in decoding, additional information indicating "intra not coded" is received, and referring to the lower layer, if the lower layer is "all_0", all MBs of the enhancement layer are filled with "0s". If the lower layer is "all_255", all MBs of the enhancement layer are filled with "255s". If the lower layer is not "all_0" or "all_255", an up-sampling from the MB of lower layer is done to thereby form the MB of the enhancement layer.

Figure 1:
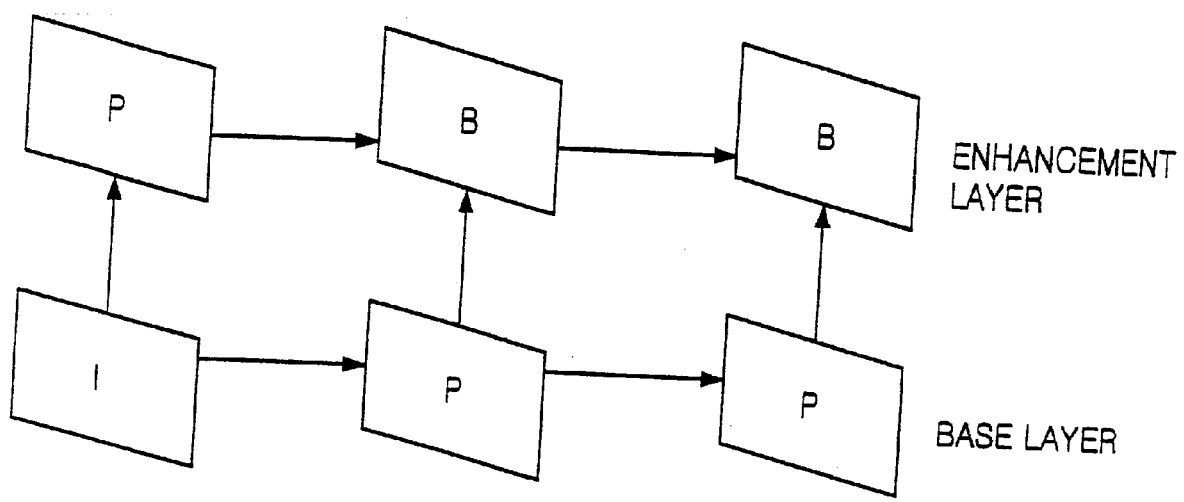
Figure 2:
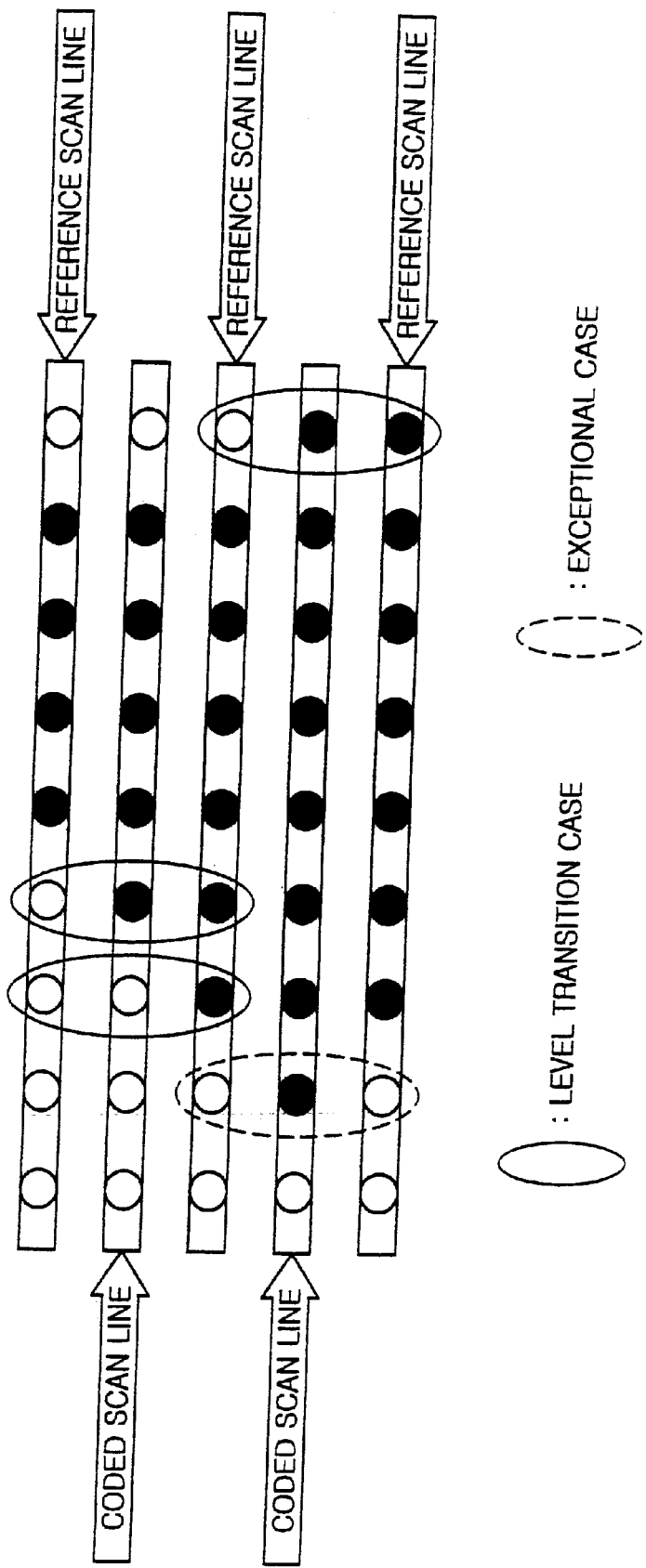
Figure 4:
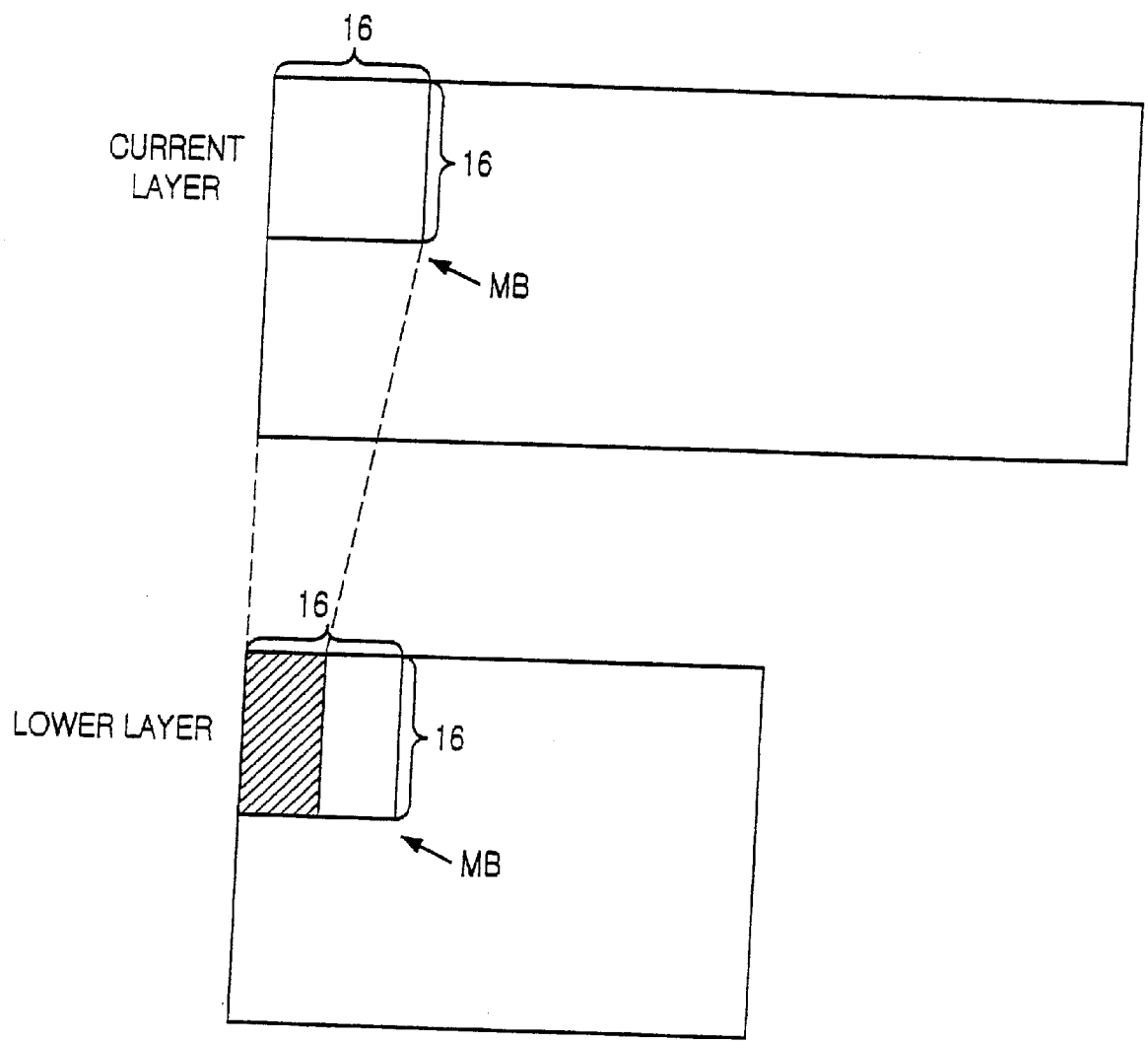
Figure 5:
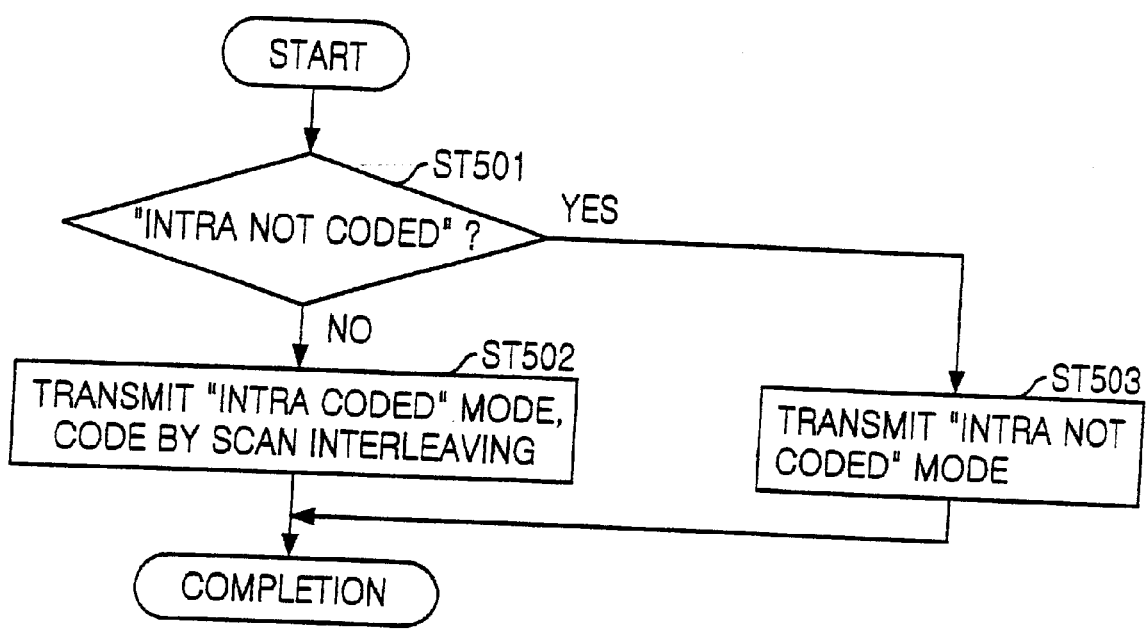

FIG. 5 illustrates a flow char providing a method for coding an enhancement layer of an I-picture in the present invention.

In a step ST501, it is detected whether or not a current MB is "intra not coded". Since the "intra not coded" mode includes three modes of "all_0", "all_255" and "intra predicted" in the present invention, it is detected by a process provided in FIG. 6 whether the current MB is the "intra not coded" mode.

In case the current MB is not the "intra not coded" mode, in a step ST502, additional information representing an "intra coded" mode is transmitted to a decoding apparatus, and the current MB is coded by a scan interleaving method and then transmitted to the decoding apparatus. That is, information for an existence or non-existence of ESD is transmitted, and if the ESD exists, the CAE for all MBs is performed, and if the ESD does not exist, the CAE for only TSD is executed.

In case the current MB is the "intra not coded" mode, in a step ST503, additional information representing an "intra not coded" mode is transmitted to the decoding apparatus.

Figure 6:
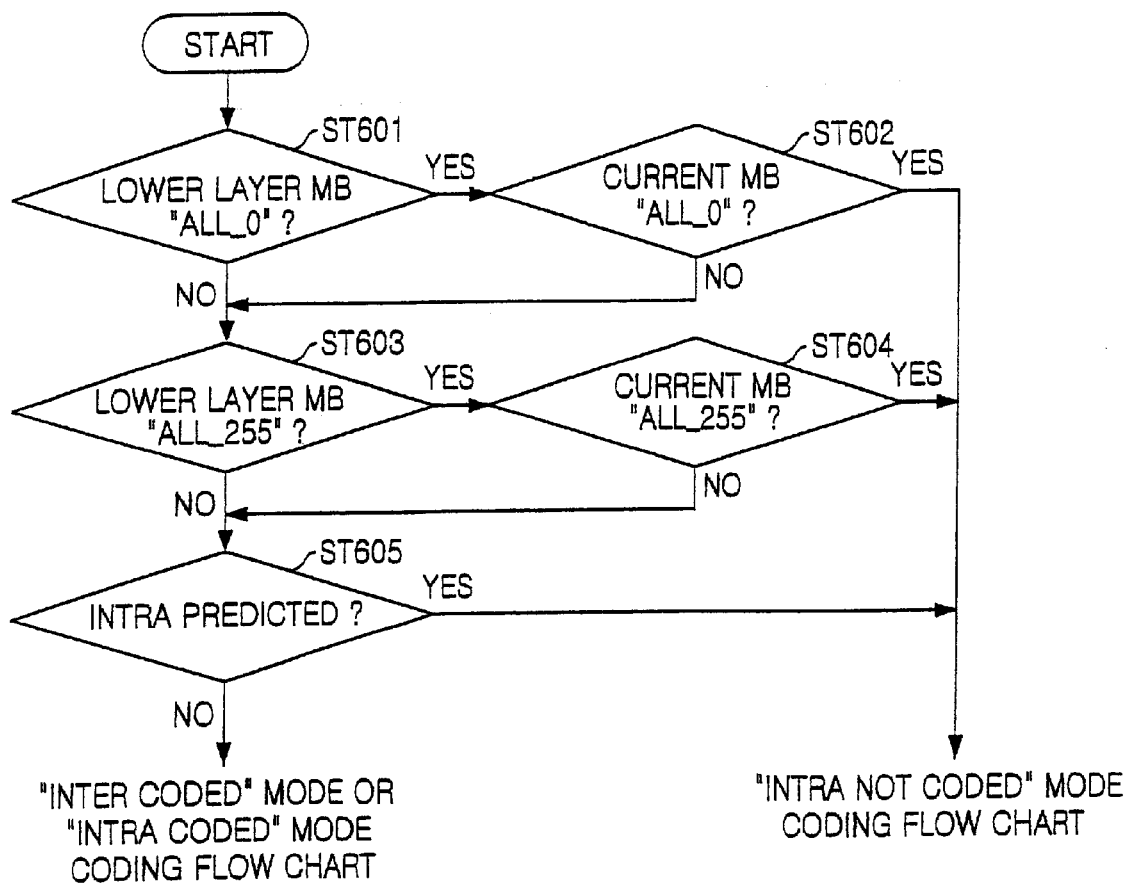
FIG. 6 illustrates a flow chart showing a method for detecting whether an image of an enhancement layer is an "Intra not coded" mode in the present invention.

Since the "intra not coded" mode corresponds to the "all_0", "all_255", "intra predicted" and "intra not coded" modes in the present invention, it is detected whether it belongs to such three cases as shown in FIG. 6. FIG. 6 is a flow chart showing a method for detecting whether or not the enhancement layer in the invention is the "intra not coded" mode.

In a step ST601, it is detected whether a domain of the lower layer corresponding to the current MB is the "all_0" mode. Since the lower layer is obtained by down-sampling a layer that the current MB exists, the domain of the lower layer belonging to the current MB is smaller than a macro block. If the domain of lower layer is the "all_0" mode, in a step ST602, it is detected whether the current MB is the "all_0" mode. If the current MB and a domain of its corresponding lower layer are the "all_0" mode simultaneously, the additional information representing the "intra not coded" mode is transmitted to the decoder.

In case the current MB or the domain of its corresponding lower layer is not the "all_0" mode, in a step ST603, it is detected whether the domain of the lower layer corresponding to the current MB is the "all_255" mode. In case the domain of lower layer is the "all_255" mode, in a step ST504, it is detected whether the current MB is the "all_255" mode. In case the current MB and the domain of its corresponding lower layer are the "all_255" mode simultaneously, the additional information representing the "intra not coded" mode is transmitted to the decoder. In case the current MB or the domain of its corresponding lower layer is not the "all_255" mode, in a step ST605, it is detected whether the current MB is the "intra predicted" mode. In case the current MB is the "intra predicted" mode, it is progressed a step for transmitting additional information indicating the "intra not coded" mode to the decoder. In case the current MB is not the "intra predicted" mode, it is progressed a step for coding the "intra code" or "inter coded" mode.

Figure 7:
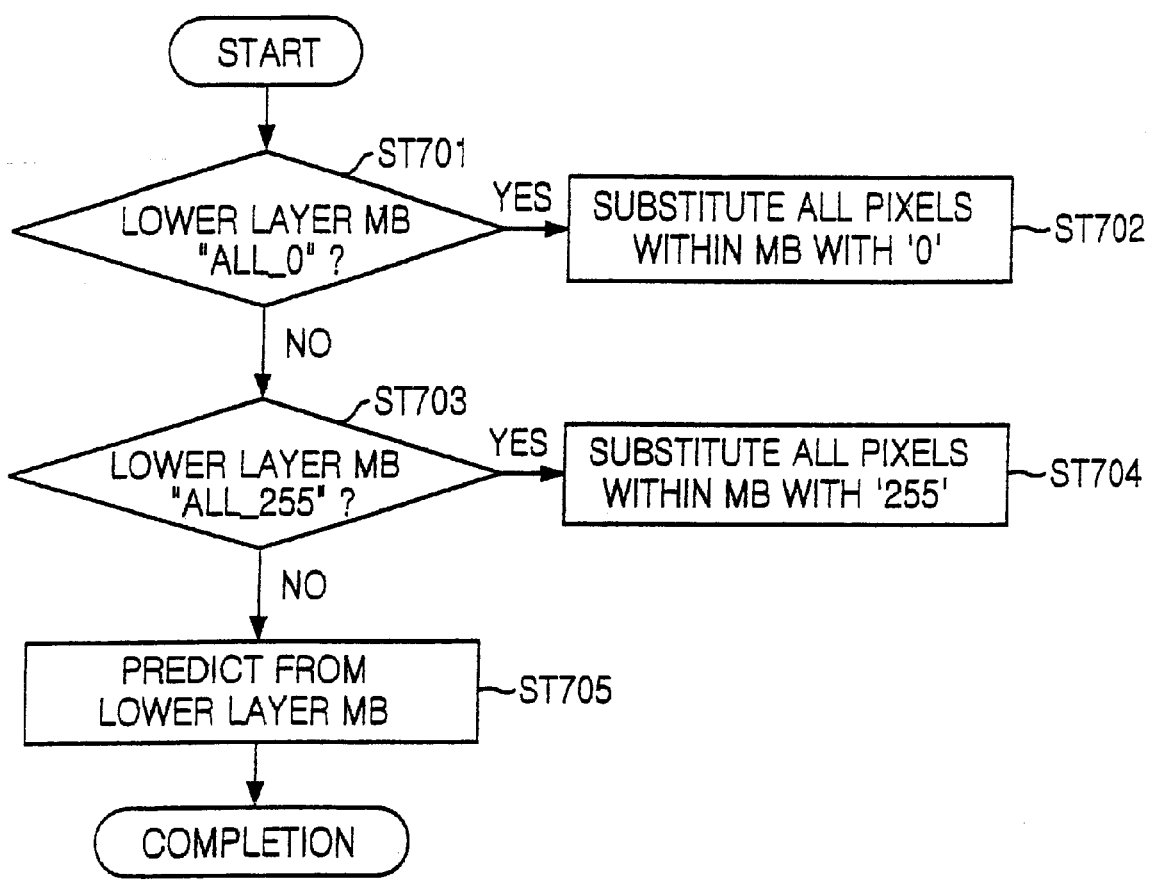
FIGS. 7 and 8 are flow charts indicating a method for decoding when mode information decoded in a bitstream is an "intra not coded".
Figure 8:
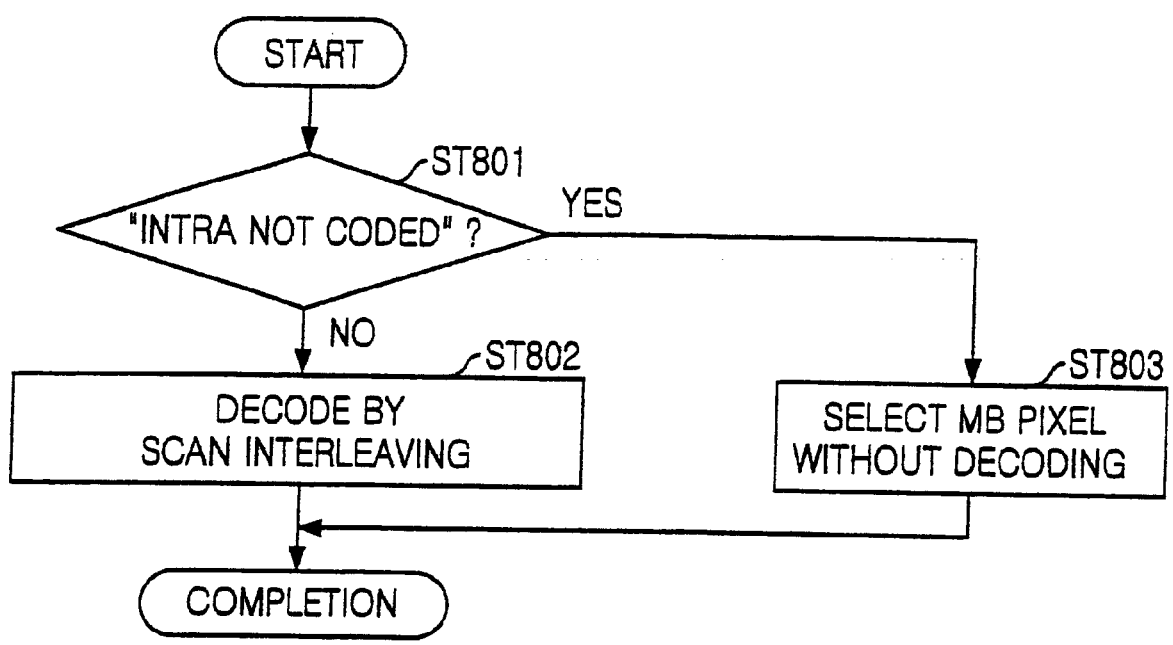

As shown in FIGS. 7 and 8, a decoding reception terminal executes a decoding from the "intra not coded" mode and separates the "all_0" and "all_255" modes from the "intra not coded" mode, and then executes corresponding operations respectively. If the mode information decoded in a bitstream is the "intra not coded" mode, a decoding shown in FIG. 7 is progressed.

In a step ST701, in case that an MB of the lower layer is "all_0" or all pixels as a sample within a domain of the lower layer corresponding to the current layer MB are '0', the MB of the current layer belongs to "all_0" and in a step ST702 all pixels within the MB of the current layer are substituted with '0's In a step ST703, in case that the MB of the lower layer is "all_255" or all pixels within the domain of the lower layer corresponding to the current layer MB have the values '255s', the MB of the current layer belongs to "all_255" and in a step ST704 all pixels within the MB of the current layer are substituted with '255s'.

If the MB of the lower layer is not "all_0" and "all_255", it is a case that pixels having '0' and '255' exist together within the domain of the lower layer corresponding to the current layer MB. Such a case corresponds to "intra not coded" having the same meaning in the existing method. In this case, in a step ST705, an MB obtained through an execution of a prediction from the lower layer is used as an MB of the current layer.

The mode of the enhancement layer on the P-picture and B-picture in a conventional system is made up of eight modes, but in the coding method based on the present invention, three modes, namely the "all_0", "all_255" and "intra not coded" modes, are coded as the "intra not coded" mode, to be then transmitted to the decoding apparatus. Such method is equal to a method in the enhancement layer of the I-picture.

A complication for searching for a motion vector is reduced by not transmitting the motion vector in the invention. Therefore, the conventional "inter coded && MVD=0" and "inter coded && MVD!=0" are represented as "inter coded", and the conventional "inter not coded && MVD=0" and "inter not coded && MVD!=0" are represented as "inter not coded". As its result, the coding mode for the enhancement layer of P-picture or B-picture has four modes as follows.
(1) "Intra not coded" ("all_0", "all_255", "intra not coded")
(2) "Intra coded"
(3) "Inter not coded" ("Inter not coded && MVD=0", "Inter not coded && MVD!=0")
(4) "Inter coded" ("Inter coded && MVD=0", "Inter coded && MVD!=0")

In case the coding mode is the "intra not coded" and "intra coded", it has the same meaning as "intra not coded" and "intra coded" of the enhancement layer on an I-VOP.

In case the coding mode is "inter coded" and "inter not coded", a motion vector is needed in order to bring the macro block by compensating a motion from a previous VOP. The motion vector is used by adjusting a motion vector of the base layer to a rate of a VOP size.

For a motion vector of "inter not coded", a motion vector of the base layer is used as it is. In case the base layer is "MVDs==0 && No Update" or "MVDs!=0 && No Update", the motion vector is '0'. The "inter not coded" mode means that an MB brought from the previous VOP is compared with the current MB by using the motion vector of the lower layer, and that the sum of pixels within the MB, having a difference by a comparison result, is under a reference value. Thus, in case the coding mode is the "inter not coded" mode, the MB is brought from the previous VOP by utilizing the motion vector of the lower layer, and an additional coding or decoding is not done.

For a motion vector of "inter coded", a motion vector of the base layer is used as it is. In case the base layer is "MVDs==0 && No Update" or "MVDs!=0 && No Update", the motion vector is '0'. The "inter coded" mode means that an MB brought from the previous VOP is compared with the current MB by using the motion vector of the lower layer, and that the sum of pixels within the MB, having a difference by a comparison result, is more than the reference value. Thus, in case the coding mode is the "inter coded" mode, the CAE is performed by using the MB brought from the previous VOP through a use of the motion vector of the lower layer, to thereby gain an MB of the enhancement layer.

In the present invention, the mode number of enhancement layer for the P-picture and B-picture is reduced from 8 modes in the existing system to 4 modes.

FIG. 9 offers a flow chart provided for the sake of coding the P-picture and B-picture of enhancement layer in the present invention. In a step ST901, it is detected by the method described through FIG. 6 whether the current MB is "intra not coded". When the current MB is the "intra not coded" mode, the coding is not done, and in a step ST902, only additional information showing the "intra not coded" mode is transmitted. When the current MB is not the "intra not coded" mode, the motion vector of the base layer is adjusted to a rate of an image size and used, for motion vectors of "inter not coded", "inter coded" and "inter not coded", to thereby regenerate the motion vector in a step ST903. In a step ST904, it is detected whether the current. MB is the "inter not coded" mode. In case the current MB is "inter not coded", the current MB is not coded but only additional information indicating "inter not coded" is transmitted, in a step ST905.

In case the current MB is not "inter not coded", it is detected in a step ST906 whether the current MB is the "intra coded" mode. In case the current MB is "intra coded", additional information indicating the "intra coded" mode and data gotten by coding the current MB through the scan interleaving method are transmitted to the decoding apparatus, in a step ST908. In case the current MB is not "intra coded", in a step ST907, additional information indicating the "inter coded" mode is transmitted and the CAE for the current MB is executed and then the CAE coded macro block is transmitted to the decoding apparatus.

In case the current MB is the "inter coded" and "inter not coded" modes, the motion vector is needed in order to bring an MB by performing a motion compensation from/on the previous image. The motion vector is used after adjusting a motion vector of the base layer to a rate of an image size.

The following is a method for obtaining a motion vector from the base layer.

First, in case a mode of a corresponding MB on the base layer is "all_0", "all_255" or "intraCAE", a motion vector of an MB on the current layer is '0'.

Secondly, in case the mode of corresponding MB on the base layer is "MVDs==0 && No Update", ""MVDs!=0 &&

No Update", "interCAE && MVDs==0" or "interCAE && MVDs!=0", a motion vector regenerated on the base layer is used.

In such process, the motion vector of the base layer is adjusted according to a ratio of an image size of the base layer and the current layer. An X axial motion vector is adjusted according to a rate of an X axial size on an image and a Y axial motion vector is adjusted according to a rate of a Y axial size on the image. For example, referring to FIG. 10, if an image of the current layer, 101, is n times larger on an X axial than an image of the base layer 102, a motion vector of the current layer, V, equals to n times v, v being a motion vector of the base layer. Namely it becomes V=n*v. If the image of the current layer, 101, is m times larger on a y axial than the image of the base layer 102, the motion vector of the current MB is gained by multiplying the motion vector of y axial by m, on the motion vector of the base layer.

FIG. 11 presents a flow chart for decoding P-picture or B-picture of the enhancement layer in the invention. In a step ST110, a mode is decoded from a bitstream. In case the current MB is "intra not coded" in a step ST111, a pixel is selected without a decoding according to a mode of a corresponding macro block in a step ST112. In case the current MB is "intra not coded" in a step ST111, a pixel is selected without a decoding according to a block of a corresponding macro block. In case the current MB is not the "intra not coded" mode, a motion vector of the lower layer is used as it is as afore-mentioned system, for motion vectors of "inter not coded", "inter coded" and "inter not coded", to thereby regenerate the motion vector in a step ST113. In a step ST114, it is detected whether the current MB is the "inter not coded" mode. In case the current MB is "inter not coded", in a step ST115 the current MB is not coded but a motion compensation is done from a previous image to thus fill pixels of the current MB with. In case the current MB is not "inter not coded", in a step ST116, it is detected whether the current MB is the "intra coded" mode. In case the current MB is "intra coded", the current MB is decoded by a scan interleaving method in a step ST118. If not "intra coded", the CAE for the current MB is executed in a step ST117.

FIG. 12 furnishes a block diagram showing the construction of an inventive scalable shape coding apparatus. A large number of subsampling units 1210, 1211, . . . , 121N-2, 121N-1, receive images from its previous subsampling units 1210, 1211, . . . , 121N-2 and perform a subsampling. Numbers of scan order converting units 1220, 1221, . . . , 122N-1, 122N, receive images of respective layers subsampled in the subsampling units 1210, 1211, . . . , 121N-2, 121N-1, and divide the images into macro blocks of a given size and then output them. Numerous scalable shape coding units 1230, 1231, . . . , 123N-1, 123N receive image macro blocks of the respective layers and image blocks of the base layer and previous images of the respective layers from the scan order converting units 1220, 1221, . . . , 122N-1, 122N, and encode three modes of "all_0", "all_255" and "intra not coded" as one mode. The scalable shape coding units 1230, 1231, . . . , 123N-1, 123N also perform a scalable shape coding by encoding "inter not coded && MVD=0" and "inter not coded && MVD!=0" as the "inter not coded" mode and "inter coded && MVD=0" and "inter coded && MVD!=0" as the "inter coded" mode.

The inputted pictures are inputted to the N-1 layer subsampling unit 121N-1 and the N layer scan order converting unit 122N. The N layer scan order converting unit 122N divides an N layer image into macro blocks of a given size, e.g., macro blocks of 16×16, etc., and then outputs them. These macro blocks are scalably encoded in an N layer scalable shape coding unit 123N and transmitted by a bitstream to the decoding apparatus. The N layer scalable shape coding unit 123N receives previous images of an N layer, macro blocks of the N layer image, macro blocks of an N-1 layer image and motion vectors of a base layer coding unit 1230, and performs a scalable shape coding.

An N-1 layer subsampling unit, 121N-1 layer, subsamples inputted images, converts the images into N-1 layer images, and outputs the converted images. For instance, the images are divided into MBs of 2×2, and one pixel per 2×2 MB is extracted therefrom and made to subsampled images. Such subsampled N-1 layer image is divided into MBs of a given size in the N-1 layer scan order converting unit 122N-1, and inputted to the N-1 layer scalable shape coding unit 123N-1. The N-1 layer scalable shape coding unit 123N-1 receives previous images of an N-1 layer, MBs of N-1 layer image, MBs of an N-1 layer image and motion vectors of a base layer coding unit 1230, and performs a scalable shape coding.

Like the above-mentioned, several subsamplings for the N layer to the N-1 layer, the N-1 layer to the N-2 layer, . . . are done; such subsampled image MBs of respective layers and image MBs of its lower layer and previous images of the respective layers are inputted to numerous scalable shape coding units 1230, 1231, . . . , 123N-1, 123N; three modes of "all_0", "all_255" and "intra not coded" are encoded as one mode of "intra not coded"; "inter not coded && MVD=0" and "inter not coded && MVD!=0" are scalably encoded as the "inter not coded" mode; and "inter coded && MVD=0" and "inter coded && MVD!=0" are scalably coded as the "inter coded" mode. Therefore, the scalable shape coding is fulfilled for numerous image layers having resolution of the N+1 number of layers.

FIG. 13 offers a block diagram presenting one embodiment of an inventive scalable shape coding unit. The scalable shape coding units 1230, 1231, . . . , 123N-1, 123N of the respective layers have the same structure, and for the sake of an explanatory convenience, the scalable shape coding unit of N layer 123N is described.

A motion vector adjusting unit 131 receives a motion vector from the scalable shape coding unit 1230, enlarges the motion vector to a rate of the current and base layers, and outputs it. A motion compensating unit 132 receives a previous image of the current layer, the N layer, and the adjusted motion vector outputted from the motion vector adjusting unit 131, searches for a part corresponding to the current MB from the previous image of the current layer, and outputs it. A CAE coding unit 133 receives MBs of the current layer image and the motion compensated previous image of the current layer and performs a CAE coding. A scan interleaving coding unit 134 receives MBs of the current layer image and the lower layer (N-1 layer) image and executes a coding through the scan interleaving method. An "intra not coded" mode deciding unit 135 receives MBs of the current layer image and the lower layer image and outputs a signal indicating whether or not the MB is the "intra not coded" mode. An "inter not coded" mode deciding unit 136 receives MBs of the current layer image and the motion compensated previous image of the current layer outputted from the motion compensating unit 132 and outputs a signal indicating whether or not the current MB is the "inter not coded" mode. A comparison unit 137 compares sizes of bitstream outputted from the scan interleaving coding unit 134 and the CAE coding unit 133 and outputs a signal for selecting the smaller bitstream. A mode table storing unit 138 receives signals from the "intra not coded"

mode deciding unit 135, the "inter not coded" mode deciding unit 136 and the comparison unit 137 and outputs data corresponding to a mode selected by a compound of the signals. A selection unit 139 receives the "intra not coded" mode deciding signal, the "inter not coded" mode deciding signal and a comparison result signal of the comparison unit 137, and selects and outputs one of signals outputted from the scan interleaving coding unit 134 and the CAE coding unit 133.

The "intra not coded" mode deciding unit 135 receives MBs of the current layer image and the lower layer image, the current layer being, e.g., an N layer, and the lower layer being, e.g., an N–1 layer. The "intra not coded" mode deciding unit 135 also decides whether the MB of current layer image is the "intra not coded" mode and outputs its result signal, referring to FIG. 6.

FIG. 14 shows a block diagram providing the construction of an inventive "intra not coded" mode deciding unit. An object/background non-code deciding unit 141 carries out an up-sampling for a macro block of the lower layer corresponding to the current MB, and extracts a difference absolute value between the up-sampled MB and the current MB, and detects whether its difference is less than a threshold value. A lower layer object mode deciding unit 142 receives a macro block of the lower layer corresponding to the current MB and detects whether it is an object mode. A lower layer background mode deciding unit 143 receives an MB of the lower layer corresponding to the current MB and detects whether it is a background mode. A current layer object mode deciding unit 144 receives the current MB and detects whether it is the background mode. A current layer background error deciding unit 145 receives the current MB and detects whether it is the object mode. A logical operation unit 146 executes a logical operation for signals outputted from the object/background non-code deciding unit 141, the lower layer object mode deciding unit 142, the lower layer background mode deciding unit 143, the current layer object mode deciding unit 144 and the current layer background error deciding unit 145, and outputs a signal representing whether any one mode of "all_0", "all_255" and "intra predicted" is generated.

The object/background non-code deciding unit 141 includes an up-sampling sector 141a for up-sampling the MB of the lower layer corresponding to the current MB, a difference absolute value extracting sector 141b for extracting the difference absolute value between the up-sampled MB of the lower layer and the current MB and an error comparing sector 141c for detecting whether the extracted difference absolute value is less than the threshold value.

The up-sampling sector 141a converts the MB of the lower layer corresponding to the current MB into an MB having the same size as the current MB by using an interpolation regulation for repeating horizontally and vertically. A differential value between pixels of the up-sampled lower layer MB and the current MB is calculated in the difference absolute value extracting sector 141b and its differential value is applied to an absolute value, wherein the pixels thereof respectively correspond to them of the current MB. In such a process, each of the pixels of the current MB and the up-sampled lower layer MB has a value of '0' or '255' and the current MB, thus the absolute value for the differential value also has a value of '0' or '255'. That is, since the value of '255' is presented in only case that mutually different values are subtracted, a pixel of a position having the value of '255' represents that the current MB is different from the up-sampled lower layer MB.

The macro block made up of such difference absolute values is inputted to the error comparing sector 141c, to thereby check whether an error is under a reference value. In other words, the macro block constructed with the difference absolute values is divided into MBs of 4×4 size, and the error is detected as the value under the reference value when the error value of all macro blocks is less than the threshold value or same as. When the error is under the reference value, it becomes the "intra predicted" mode and the error comparing sector 141c outputs '1'.

The lower layer object mode deciding unit 142 includes an object deciding sector 142a for checking whether all images of the lower layer corresponding to the current macro block have an object value, e.g., '255',outputting '1' in case all is the object value, and outputting '0' in case all is not the object value; and an OR gate 142b for executing an OR operation for outputs from the object deciding sector 142a and a mode of MB on the previous image of the lower layer.

The lower layer MB corresponding to the current MB is inputted to the lower layer object mode deciding unit 142 if all pixels constituting the lower layer MB corresponding to the current MB have '255s' of the object values, '1' is outputted to represent the "all_255" mode. If not, a '0' signal is outputted. When even one of a mode of MB on the previous image of the lower layer and the object deciding sector 142a outputs '1', that is, if all pixels of the lower layer macro block corresponding to the current MB have the value of '255',or even though there exist pixels which do not have the value of '255', if their values represent the "all_255" mode as values less than the threshold value, the OR gate 142b outputs '1'.

The lower layer background mode deciding unit 143 includes; a background deciding sector 143a for detecting whether or not all pixels constituting the lower layer MB belonging to the current MB have '0s' as a background value; and an OR gate 143b for performing the OR operation on a mode of MB on the previous image of the lower layer and the background deciding sector 143a.

The lower layer MB corresponding to the current MB is inputted to the lower layer object made deciding unit 142. The background deciding sector 143a outputs '1' if all pixels on the lower layer domain belonging to the macro block of the current layer are '0s'. If not, the background deciding sector 143a outputs '0'. The OR gate 143c outputs '1' when even any one out of a mode of MB on the previous image of the lower layer and the background deciding sector 143a outputs '1'. That is to say, if the lower layer MB corresponding to the current MB is the "all_0" mode, the OR gate 143c outputs '1',the "all_0" mode being a case that all pixels are '0s' or values of pixels not '0'" are under the threshold value.

The current layer object mode deciding unit 144 is made up of an object difference absolute value extracting sector 144a for obtaining differential values between inputted current MBs and MBs all having a value of '0' and taking their absolute values; and an error comparing sector 144b for detecting whether or not the extracted difference absolute value is under the threshold value.

The current MBs are inputted to the current layer object mode deciding unit 144, and MB all having a value of '0' and an absolute value on a differential value are taken thereto. In the error comparing sector 144b, it is detected whether such difference absolute value is less than the threshold value. If less than the threshold value, the current MB becomes the "all_255" mode and the error comparing sector 144b outputs '1'.

The current layer background error comparing unit 145 receives the current MB and divides the current MB into blocks of 4×4 and detects that the error is under the reference value when the error of the MBs is less than the threshold value, 16×alpha, or same as. In case it is detected that the error is under the reference value, the error comparing sector 145 outputs '1', to thereby represent that the current MB is the "all_0" mode.

When the lower layer object mode deciding unit 142 and the current layer object deciding unit 144 output '1' simultaneously, an AND gate U1 outputs '1'. That is, when the current layer MB and its corresponding lower layer MB have an object value together, the AND gate U1 outputs '1'. Likewise, when the lower layer background mode deciding unit 143 and the current layer background mode deciding unit 145 output '1' at the same time, an AND gate U2 outputs '1'. That is to say, the current layer MB and its corresponding lower layer MB have a background value together, the AND gate U2 outputs '1'. Thus, if even any one out of "all_0", "all_255" and "intra predicted" corresponds thereto, an AND gate U4 outputs '1'. It thus means that any one among "all_0", "all_255" and "intra predicted" was generated.

FIG. 15 shows a block diagram presenting the construction of an inventive "inter not coded" mode deciding unit. The "inter not coded" mode deciding unit includes a difference absolute value extracting 151 for receiving the current MB and a corresponding MB of a motion compensated previous image and taking its difference absolute value; an error comparing unit 152 for detecting whether the difference absolute value is less than the threshold value; and an AND gate 153 for performing an AND operation on information I/P, B, wherein the information is about that an output from the error comparing unit 152 and the currently inputted image are an intra mode I and a predicted mode P or a both direction predicted mode B.

The difference absolute value extracting unit 151 receives the current MB and a corresponding MB of a motion compensated previous image and then takes its difference absolute value, after that, only pixels of positions having values different from one another have a value of '255'. The error comparing unit 152 detects whether the difference absolute value is less than the threshold value. When the current image is the intra mode, the I/P and B signals have a value of '0'. Thus, the AND gate 153 outputs a comparison result of the error comparing unit 152 in only case that the current image is the predicted mode P or the both direction predicted mode B.

FIG. 16 gives a block diagram showing the construction of an inventive scalable shape decoding apparatus.

In the scalable shape decoding apparatus, the N+1 number of layers are presented so as to be compared with the scalable shape coding apparatus shown in FIG. 12. A large number of scalable shape decoding units 1610, 1611, . . . , 161N-1, 161N respectively receive bitstreams of respective layers, a motion vector of base layer, previous images and decoding images, to perform a scalable shape decoding. An image storing unit 162 stores image MBs of a current layer outputted from the N layer scalable shape coding unit 161N.

FIG. 17 sets forth a block diagram providing the construction of an inventive scalable shape decoding unit.

Scalable shape decoding units on respective layers, 1610, 1611, . . . , 161N-1, 161N have the same structure as one another and the scalable shape decoding unit 161N of an N layer is described for the sake of an explanatory convenience.

A motion vector adjusting unit 171 receives a motion vector from the base layer scalable shape decoding unit 1610, enlarges the motion vector by a rate of the current and base layers, and outputs it. A motion compensating unit 172 receives a previous image of the current layer, the N layer, and the adjusted motion vector outputted from the motion vector adjusting unit 171, compensates a motion for a macro block B corresponding to the current MB from the previous image of the current layer, and outputs it. A mode decoding unit 173 receives current layer bitstreams and the I/P and B signals and decodes mode information. An "intra not coded" MB constructing unit 174 receives MBs of a lower layer image and their modes, and processes them according to a regulation decided previously and outputs current image MBs A. A CAE coding unit 176 receives bitstreams of the current layer image and motion compensated previous image of the current layer, and outputs signals D executed in a CAE coding. A scan interleaving decoding unit 175 receives the bitstreams of the current layer image and MBs of the lower layer (N-1 layer) image, and outputs signals C decoded by a scan interleaving method. A multiplex unit 177 outputs one out of A, B, C and D according to a mode decoded in the mode decoding unit 173.

FIG. 18 is a block diagram showing the construction of the "intra not coded" MB constructing unit in the scalable shape decoding unit in accordance with the present invention. An object mode deciding unit 181 outputs '1' when all pixels constituting the lower layer MB corresponding to the current MB have '255s'. If not, the object mode deciding unit 181 outputs '0'. In case a mode of the lower layer MB is "all_255" or an output of the object mode deciding unit 181 is '1',an output of the OR gate U1 is '1'. In a background mode deciding unit 182, all pixels within an area corresponding to the current layer MB, among pixels within a lower layer MB, have a value of '0', a value of '1' is outputted, if not, a value of '0' is outputted. In case that a mode of the lower layer MB is "all_0" or an output of the background mode deciding unit 182 is '1', an output of an OR gate U2 is '1'. An "all_0" block generating unit 183 generates MBs in which all pixels have a value of '0'. An "all_255" block generating unit 184 generates MBs in which all pixels have a value of '255'. An up-sampling unit 185 up-samples a domain of the lower layer to construct a current MB. A first multiplexer 186 selects an output from the "all_255" block generating unit 184 or the up-sampling unit 185 in response to an output signal of the OR gate U1. A second multiplexer 187 selects an output from the "all_0" block generating unit 183 or the first multiplexer 186 in response to an output signal of the OR gate U2.

In the object mode deciding unit 181, if all pixels within an area corresponding to the current layer MB, among pixels within a lower layer MB, have a value of '255', '1' is outputted, and if not, '0' is outputted. If a mode of the lower layer MB is "all_255" or an output of the object mode deciding unit 181 is '1', an output of the OR gate U1 is '1'. Such "all_0" and "all_255" modes are not used for transmitting, coding and decoding but they are used by storing outputs from the OR gates U1, U2 at every MB by the "all_0" and "all_255" modes.

In the background mode deciding unit 182, all pixels within an area corresponding to the current layer MB among pixels within a lower layer MB have a value of '0', a value of '1' is outputted, if not, a value of '0' is outputted. In case that a mode of the lower layer MB is "all_0" or an output of the background mode deciding unit 182 is '1', an output of the OR gate U2 is '1'. The "all_0"block generating unit 183 generates MBs in which all pixels have a value of '0', and all pixels of an outputted MB have a value of '0'. The "all_255" block generating unit 184 constructs MBs in which all pixels have a value of '2550', and all pixels of an outputted MB have a value of '255'.

The up-sampling unit 185 up-samples a domain of the lower layer to thereby construct a current MB. If an output "all_255" of the OR gate U1 is '1', the first MUX 186 selects, as its own output, an output of the "all_255" block generating unit 184, namely the MBs in which all pixels have a value of '255'. If '0', an output of the up-sampling unit 185, namely an up-sampled MB, is selected. If an output "all_0" of the OR gate U2 is '1', the second MUX 187 selects an output of the "all_0" block generating unit 183 as its own output, namely the MBs in which all pixels have a value of '0'. If '0', an output of the first MUX 186 is selected.

In coding an image to multiple of layers, there is a high correlation between an enhancement layer and its down sampled lower layer. In other words, if the enhancement layer is the "intra not coded" mode, there is a high probability for that its lower layer may be also the "intra not coded" mode. What bits for a coding mode of enhancement layer on an I-picture and P-picture, or B-picture, are assigned by considering such correlation, is the method capable of lessening the quantity of coding bits. The following describes a bit assigning method for a coding mode of the enhancement layer on the I-picture and P-picture(B-picture).

When the lower layer coding mode is known, a generating bit number for the coding mode of enhancement layer is assigned with the small quantity by using Huffman coding system, if a generating probability is high, and if the generating probability is low, a long bitstream is assigned. For example, in case the lower layer is the "intra not coded" mode, a probability that the current layer may be the "intra not coded" mode is highest, thus bits on the shortest length are assigned, and then 2,3, ... bits are assigned to a coding mode having a high generative probability. Since the "intra coded" modes are most generated in a coding mode of MB, most of "intra coded" modes receive bits of relative small quantity as 1 bit or 2 bits regardless all coding modes.

An example through an inventive coding bit assigning method is presented as follows.

|  |  | Enhancement Layer Mode | | | |
| --- | --- | --- | --- | --- | --- |
|  |  | (1) | (2) | (3) | (4) |
| lower layer mode | (1) | 1 | 2 | 3 | 3 |
|  | (2) | 2 | 1 | 3 | 3 |
|  | (3) | 3 | 2 | 1 | 3 |
|  | (4) | 3 | 1 | 3 | 2 |

The following provides an embodiment for the enhancement layer mode, when the lower layer mode is known through the above-mentioned method. Two codes for each assigned bit of each enhancement layer is herewith used as follows.
(1) 1 bit: 0, 2 bit: 10, 3 bit: 110, another 3 bit: 111
(2) 1 bit: 1, 2 bit: 01, 3 bit: 001, another 3 bit: 000

The following describes an additional information constructing method and a code table of the present invention on an enhancement layer of the I-picture and P-picture, and B-picture.

In an enhancement layer of the I-picture, two kinds of modes as the following are used.
(1) "intra not coded"
(2) "intra coded"

In the conventional method, on an enhancement layer of the I-picture, three kinds of modes are used, namely, "all_0", "all_255" and "intra coded". In the present invention, the "all_0" and "all_255" modes in the existing system and the "intra not coded" mode on the enhancement layer of P-picture and B-picture in the existing system are transmitted by one mode "intra not coded". A receiving terminal detects by using information of the lower layer whether or not the received "intra not coded" mode is "all_0" or "all_255". Accordingly, only two modes are used in the present invention, in comparison with the conventional method using three modes, thereby resulting in reducing the quantity of bits required for transmitting modes.

Codes of modes for respective MBs are encoded by using a code table such as the following table. Each mode has a fixed length and 1 bit for it is transmitted.

| Shape Mode | Code |
| --- | --- |
| "intra not coded" | 1 |
| "intra coded" | 0 |

In an MPEG-4 the standardization of which is presently under a progression on the ISO/IEC WG11, in order to discriminate an image from a bitstream, twenty-three consecutive '0s' within the image are represented when an image starts to. In case 23 consecutive '0s' are generated within the image, it is decided as the beginning of the image. In case it is not the beginning of the image, it is thus necessary not to generate 23 consecutive '0s'. It is profitable to generate many '1s' as possible so that 23 consecutive '0s' may not be easily generated, 23 consecutive '0s' being available to be easily generated by a case that some '1s' out of '1s' can be changed to '0s' owing to a transmission error. Accordingly, the code table is changed as follows so that the code table shown in the above may include '1' on the mode of "intra coded".

| Shape Mode | Code |
| --- | --- |
| "intra not coded" | 1 |
| "intra coded" | 01 |

A first method for coding the lower layer of P-picture is as follows.
(1) "all_0" or "all_255" or "intra not coded"
(2) "intraCAE" or "intra coded"
(3) "MVDs==0 && No Update" or "MVDs!=0 && No Update" or "inter not coded"
(4) "interCAE && MVDs==0" or "interCAE && MVDs!=0" or "inter coded"

Coding modes of an enhancement layer on the P-picture are as follows.
(1) "Intra Not Coded"
(2) "Intra Coded"
(3) "Inter Not Coded"
(4) "Inter Coded"

In a case of the enhancement layer of the P-picture and B-picture, four kinds of modes are used as follows.
(1) "intra not coded"
(2) "intra coded"
(3) "inter not coded"
(4) "inter coded"

In the conventional system, a mode of the enhancement layer on the P-picture and B-picture is constructed by eight modes. In the present invention, three modes as the "all_0", "all_255" and "intra not coded" modes become one mode as the "intra not coded" mode, to be then transmitted to the decoding apparatus. Such method is equal to a method in a mode for the enhancement layer of the I-picture. A complication for searching for a motion vector is reduced by not transmitting the motion vector in the present invention. Therefore, the conventional "inter coded && MVD=0" and "inter coded && MVD!=0" modes are represented as one mode "inter coded", and the conventional "inter not coded && MVD=0" and "inter not coded && MVD!=0" modes are represented as one mode "inter not coded". In case the coding mode is "inter coded" and "inter not coded", a motion vector is needed in order to bring the macro block by compensating a motion from a previous image. The motion vector is used after adjusting a motion vector of the base layer to a rate of an image size.

A method for getting the motion vector from the base layer is as follows.

First, in case a mode of a corresponding MB on the base layer is "all_0", "all_255" or "intraCAE", a motion vector of an MB on the current layer is '0'.

Secondly, in case the mode of corresponding MB on the base layer is "MVDs==0 && No Update", ""MVDs!=0 && No Update", "interCAE && MVDs==0" or "interCAE && MVDs!=0", a motion vector regenerated on the base layer is used.

In such process, the motion vector of the base layer is adjusted according to a ratio of an image size of the base layer and the current layer. An X axial motion vector is adjusted according to a rate of an X axial size on an image and a Y axial motion vector is adjusted according to a rate of a Y axial size on the image. For instance, if an image of the current layer is n times on the X axial and m times on the y axial, larger than an image of the base layer, the motion vector of the current MB is obtained by multiplying the motion vector of X axial by n and multiplying the motion vector of Y axial by m, on the motion vector of the base layer.

In accordance with the present invention, modes for the enhancement layer of the P-picture and B-picture are reduced from eight modes in the conventional system to four modes. Codes of modes for respective MBs are encoded by using coding tables such as the following tables. In order to lessen bits generated at this time, the coding table is constructed by using pixels values and a mode of the lower layer.

A second method for coding a mode of a just lower layer is as follows. There are cases that,
(1) "all_0", "all_255", "intra not coded" or all pixels (sample) within the lower layer MB area corresponding to the current layer MB are '0' or '2550',
(2) "intraCAE" or "intra coded",
(3) "MVDs==0 && no update", "MVDs!=O && no update" or "inter not coded", and
(4) "interCAE && MVDs==0", "interCAE && MVDs!=0".

Or, there are cases that a just lower layer of "inter coded", namely a lower layer, is the base layer or is not the base layer. Such each cases may be respectively explained as follows.

First, the following is for a case that the lower layer is the base layer.
(1) "all_0" or "all_255" or all pixels (sample) within the lower layer MB area corresponding to the current layer MB are '0' or '255'
(2) "intraCAE"
(3) "MVDs==0 && no update" or "MVDS!=0 && no update"
(4) "interCAE && MVDs==0" or "interCAE && MVDs!=0".

Next, the following is for a case that the lower layer is not the base layer.
(1) "intra not coded" or all pixels (sample) within the lower layer MB area corresponding to the current layer MB are '0' or '255'
(2) "intra coded",
(3) "inter not coded"
(4) "inter coded"

The code, first shape code, for a mode of an enhancement layer is decided as follows, when all lower bases are known.

CODE TABLE 1

|  |  | Enhancement Layer Mode | | | |
| --- | --- | --- | --- | --- | --- |
|  |  | (1) | (2) | (3) | (4) |
| lower | (1) | 0 | 10 | 110 | 111 |
| layer | (2) | 110 | 0 | 10 | 111 |
| mode | (3) | 110 | 10 | 0 | 111 |
|  | (4) | 111 | 0 | 111 | 10 |

In the MPEG-4 the standardization of which is presently under a progression on the ISO/IEC WG11, in order to discriminate an image from a bitstream, twenty-three consecutive '0s' within the image are represented when an image starts to. In case 23 consecutive '0s' are generated within the image, it is decided as the beginning of the image. In case it is not the beginning of the image, it is thus necessary not to generate 23 consecutive '0s'. Since there may be generated 23 consecutive '0s' in the <code table 1>, the table such as the following is used.

CODE TABLE 2

|  |  | Enhancement Layer Mode | | | |
| --- | --- | --- | --- | --- | --- |
|  |  | (1) | (2) | (3) | (4) |
| lower | (1) | 1 | 01 | 001 | 000 |
| layer | (2) | 110 | 0 | 10 | 111 |
| mode | (3) | 001 | 01 | 1 | 000 |
|  | (4) | 110 | 0 | 111 | 10 |

A case of (3) can occur more frequently in a case that the just lower layer, lower layer, is (2) than in a case that the current layer, enhancement layer, is (1). In this case, the following table is used.

CODE TABLE 3

|  |  | Enhancement Layer Mode | | | |
| --- | --- | --- | --- | --- | --- |
|  |  | (1) | (2) | (3) | (4) |
| lower | (1) | 1 | 01 | 001 | 000 |
| layer | (2) | 10 | 0 | 110 | 111 |
| mode | (3) | 001 | 01 | 1 | 000 |
|  | (4) | 110 | 0 | 111 | 10 |

It is profitable to generate many '1s' as possible so that 23 consecutive '0s' may not be easily generated, 23 consecutive '0s' being available to be easily generated by a case that some '1s' out of '1s' can be changed to '0s' owing to a transmission error. Accordingly, the code table is changed as follows so that the code table shown in the above may include '1' for all modes. The table such as the following is constructed by correcting the <code table 2>.

CODE TABLE 4

| | | Enhancement Layer Mode | | | |
|---|---|---|---|---|---|
| | | (1) | (2) | (3) | (4) |
| lower | (1) | 1 | 01 | 001 | 0001 |
| layer | (2) | 001 | 1 | 01 | 0001 |
| mode | (3) | 001 | 01 | 1 | 0001 |
| | (4) | 001 | 1 | 0001 | 01 |

For the same reason as the above, the table such as the following is also constructed by correcting the <code table 3>.

CODE TABLE 5

| | | Enhancement Layer Mode | | | |
|---|---|---|---|---|---|
| | | (1) | (2) | (3) | (4) |
| lower | (1) | 1 | 01 | 001 | 000 |
| layer | (2) | 10 | 0 | 110 | 111 |
| mode | (3) | 001 | 01 | 1 | 000 |
| | (4) | 110 | 0 | 111 | 10 |

In the present invention, an order for deciding the mode is gained as follows by improving a conventional method. That is, in order to search for a desired image or a binary image promptly, there is a necessity to discriminate MBs of "all_0" or "all_255" from MBs which do not have "all_0" or "all_255", namely the MBs corresponding to an edge. Such a discrimination can make a binary image of a small size, which is capable of representing the MB with one pixel, and an overall image can be almost detected from the binary image of small size, and also it can be checked whether or not the binary image is the image required from the overall image. Namely, the MB of "all_0" is represented by pixels having a value of '0', and the MB of "all_255" is represented by pixels having a value of '255'. The MB which is not "all_0" or "all_255", namely MB corresponding to an edge, is represented with a value of '128' to thereby get an image of a small size. Like this, in order to definitely discriminate between the MBs which are "all_0" or "all_255", or are not "all_0" or "all_255", "all_0" or "all_255" are first decided. Thus, the mode is decided by the following described order.

It is decided by the following order on the base layer.
(1) "all_0" or "all_255"
(2) "MVDs==0 && no update" or "MVDs!=0 && no update"
(3) A mode which has a small generating quantity of bits, among "intraCAE" and "interCAE && MVDs==0" or "interCAE && MVDs!=0".

A mode deciding method for the I-picture and P-picture of the enhancement layer is used as follows, since what the "all_0" or "all_255" mode is first decided on the enhancement layer makes the quantity of generating bits small, with the above-mentioned reason.

The mode deciding method for the enhancement layer of I-picture is as follows.
(1) In a case of "all_0" or "all_255", a decision as "intra not coded"
(2) An Mb predicted from the lower layer and a current MB are compared, and in case its error is under a reference value, a decision as "intra not coded"
(3) "intra coded"

The mode decision order for the enhancement layer of P-picture or B-picture is progressed by the order presented in FIG. 9, and what "inter not coded" is decided earlier than "intra predicted" makes a generation of bits small. The following mode decision order is gotten by considering such points.
(1) In a case of "all_0" or "all_255", a decision as "intra not coded"
(2) a decision of "intra not coded"

What is claimed is:

1. A method for coding a scalable shape binary image by using a coding mode of an enhancement layer, wherein the scalable shape binary image has at least one enhancement layer including an enhanced resolution than that of a lower layer, said method comprising the steps of:

a) dividing an image of an enhancement layer into blocks having a predetermined size;

b) comparing pixels in each block of the enhancement layer with its corresponding pixels within an area of the lower layer, and determining a coding mode of each block of the enhancement layer based on the comparison result, wherein the coding mode is one of (0) "intra not coded" mode, (1) "intra coded" mode, (2) "inter not coded" mode and (3) "inter coded" mode;

c) if the coding mode for P-VOP in the enhancement layer is one of "intra not coded" mode and "intra coded" mode, transmitting additional information representing its coding mode; and d) if the coding mode for B-VOP in the enhancement layer is one of "intra not coded" mode, "intra coded" mode, "inter not coded" mode and "inter coded" mode, transmitting the additional information indicating its coding mode.

2. The method as recited in claim 1, wherein "intra not coded" mode means that the number of pixels in each enhancement layer block different from pixels of the lower layer is less than a reference value, in the case of "intra not coded" mode, the enhancement layer block is not encoded, wherein in case of "intra coded" mode, the enhancement layer block is encoded, wherein "inter not coded" mode and "inter coded" mode, no motion vector is encoded for prediction of the enhancement layer block and the motion vector of blocks of the lower layer is utilized, wherein "inter not coded" mode means that the number of pixels in each enhancement layer block predicted from a previous video object plane (VOP) different from pixels of a current VOP is less than a reference value, and in the case of "inter not coded" mode, a current block of the enhancement layer block is not encoded, and wherein in case of "inter coded" mode, the current block of the enhancement layer is encoded.

3. The method as recited in claim 1, wherein the step c) includes the step of:

if the coding mode is "intra coded " mode, coding the enhancement layer to generate a first coded data and transmitting the additional information indicating "intra coded" mode and the first coded data, wherein the first coded data is generated based on a intra mode CAE (context-based encoding) method; and wherein the step d) includes the step of:

if the coding mode is "inter coded" mode, coding the enhancement layer to generate a second coded data and transmitting the additional information indicating "inter coded" mode and the second coded data, wherein the second coded data is generated based on a inter mode CAE method.

4. The method as recited in claim 1, wherein the additional information for B-VOP in the enhancement layer has a value described in a table as:

|  |  | Enhancement Layer Mode | | | |
|---|---|---|---|---|---|
|  |  | (0) | (1) | (2) | (3) |
| Lower Layer Mode | (0) | 1 | 01 | 001 | 000 |
|  | (1) | 110 | 0 | 10 | 111 |
|  | (2) | 001 | 01 | 1 | 000 |
|  | (3) | 110 | 0 | 111 | 10. |

5. The method as recited in claim 4, wherein the coding modes (0), (1), (2), and (3) of the lower layer, in case they are the coding modes of the base layer, are respectively mapped as follows:
   (0) all_0 or all_255
   (1) intraCAE
   (2) MVDs==0 && No Update or MVDs!=0 && No Update
   (3) interCAE && MVDS==0 or interCAE && MVDS!=0.

6. The method as recited in claim 1, wherein the additional information for P-VOP in the enhancement layer has a value described in a table as:

| Coding mode | Code |
|---|---|
| "intra not coded" | 1 |
| "intra coded" | 01 |

7. A method for decoding a scalable shape binary image by using a coding mode of an enhancement layer, wherein the scalable shape binary image has at least one enhancement layer including an enhanced resolution than that of a lower layer, said method comprising the steps of:
   a) receiving additional information indicating a coding mode of the enhancement layer and determining the coding mode, wherein the coding mode is one of (0) "intra not coded" mode, (1) "intra coded" mode, (2) "inter not coded" mode and (3) "inter coded" mode;
   b) if the coding mode for P-VOP in the enhancement layer is one of "intra not coded" mode and "intra coded" mode, restoring pixels in a block of the enhancement layer (which is referred to as "a enhancement layer block") based on the coding mode; and
   c) if the coding mode for B-VOP is one of "intra not coded" mode, "intra coded" mode, "inter not coded" mode and "inter coded" mode, decoding the block of the enhancement layer based on the coding mode.

8. The method as recited in claim 7, wherein "intra not coded" mode means that the number of pixels in each enhancement layer block different from pixels of the lower layer is less than a reference value, in the case of "intra not coded" mode, the enhancement layer block is decoded based on a spatial prediction method,
   wherein in case of "intra coded" mode, the enhancement layer block is decoded based on an intra mode CAE method,
   wherein "inter not coded" mode and "inter coded" mode, no motion vector is decoded for prediction of the enhancement layer block and the motion vector of blocks of the lower layer is utilized,
   wherein "inter not coded" mode means that the number of pixels in each enhancement layer block predicted from a previous video object plane (VOP) different from pixels of a current VOP is less than a reference value, and in the case of "inter not coded" mode, a current block of the enhancement layer block is decoded based on a temporal prediction method, and
   wherein in case of "inter coded" mode, the current block of the enhancement layer is decoded based on a inter mode CAE method.

9. The method as recited in claim 7, wherein the additional information for B-VOP in the enhancement layer has a value described in a table as:

|  |  | Enhancement Layer Mode | | | |
|---|---|---|---|---|---|
|  |  | (0) | (1) | (2) | (3) |
| Lower Layer Mode | (0) | 1 | 01 | 001 | 000 |
|  | (1) | 110 | 0 | 10 | 111 |
|  | (2) | 001 | 01 | 1 | 000 |
|  | (3) | 110 | 0 | 111 | 10 |

10. The method as recited in claim 9, wherein the coding modes (0), (1), (2) and (3) of the lower layer, in case they are the coding modes of the base layer, are respectively mapped as follows:
    (0) all_0 or all_255
    (1) intraCAE
    (2) MVDs==0 && No Update or MVDs!=0 && No Update
    (3) interCAE && MVDs==0 or interCAE && MVDs!=0.

11. The method as recited in claim 7, wherein the additional information for P-VOP in the enhancement layer has a value described in a table as:

| Coding mode | Code |
|---|---|
| "intra not coded" | 1 |
| "intra coded" | 01. |

12. An apparatus for coding a scalable shape binary image by using a coding mode of an enhancement layer, wherein the scalable shape binary image has at least one enhancement layer including an enhanced resolution than that of a lower layer, said apparatus comprising:
    dividing means for dividing an image of an enhancement layer into blocks having a predetermined size;
    determining means for comparing pixels in each block of the enhancement layer with its corresponding pixels within an area of the lower layer, and determining a coding mode of each block of the enhancement layer based on the comparison result,
    wherein the coding mode is one of (0) "intra not coded" mode, (1) "intra coded" mode, (2) "inter not coded" mode and (3) "inter coded" mode;
    transmitting means for, if the coding mode for P-VOP in the enhancement layer is one of "intra not coded" mode and "intra coded" mode, transmitting the additional information representing its coding mode, and if the coding mode for B-VOP in the enhancement layer is one of "intra not coded" mode, "intra coded" mode "inter not coded" mode and "inter coded" mode, transmitting the additional information indicating its coding mode; and coding means for, if the coding mode of the enhancement layer is "intra coded" mode, coding the enhancement layer block based on a intra mode CAE method, and if the coding mode is "inter coded" mode, coding the enhancement layer block based on a inter mode CAE method.

13. The apparatus as recited in claim 12, wherein "intra not coded" mode means that the number of pixels in each enhancement layer block different from pixels of the lower layer is less than a reference value, in the case of "intra not coded" mode, the enhancement layer block is not encoded, wherein in case of "intra coded" mode, the enhancement layer block is encoded, wherein "inter not coded" mode and "inter coded" mode, no motion vector is encoded for prediction of the enhancement layer block and the motion vector of blocks of the lower layer is utilized, wherein "inter not coded" mode means that the number of pixels in each enhancement layer block predicted from a previous video object plane (VOP) different from pixels of a current VOP is less than a reference value, and in the case of "inter not coded" mode, a current block of the enhancement layer block is not encoded, and wherein in case of "inter coded" mode, the current block of the enhancement layer is encoded.

14. The apparatus as recited in claim 12, wherein if the coding mode is "intra coded" mode, the coding means codes the enhancement layer to generate a first coded data and the transmitting means transmits the additional information indicating "intra coded" mode and the first coded data, wherein the first coded data is generated based on a intra mode CAE method; and wherein if the coding mode is "inter coded" mode, the coding means codes the enhancement layer to generate a second coded data and the transmitting means transmits the additional information indicating "inter coded" mode and the second coded data, wherein the second coded data is generated based on a inter mode CAE method.

15. The apparatus as recited in claim 12, wherein the additional information for B-VOP in the enhancement layer has a value described in a table as:

|  |  | Enhancement Layer Mode | | | |
| --- | --- | --- | --- | --- | --- |
|  |  | (0) | (1) | (2) | (3) |
| Lower | (0) | 1 | 01 | 001 | 000 |
| Layer | (1) | 110 | 0 | 10 | 111 |
| Mode | (2) | 001 | 01 | 1 | 000 |
|  | (3) | 110 | 0 | 111 | 10 |

16. The apparatus as recited in claim 15, wherein the coding modes (0), (1), (2), and (3) of the lower layer, in case they are the coding modes of the base layer, are respectively mapped as follows:

(0) all_0 or all_255
(1) intraCAE
(2) MVDs==0 && No Update or MVDs!=0 && No Update (3) interCAE && MVDs==0 or interCAE && MvDs!=0.

17. The apparatus as recited in claim 12, wherein the additional information for P-VOP in the enhancement layer has a value described in a table as:

| Coding mode | Code |
| --- | --- |
| "intra not coded" | 1 |
| "intra coded" | 01. |

18. A apparatus for decoding a scalable shape binary image by using a coding mode of an enhancement layer, wherein the scalable shape binary image has at least one enhancement layer including an enhanced resolution than that of a lower layer, said apparatus comprising:

means for receiving additional information indicating a coding mode of the enhancement layer and determining the coding mode, wherein the coding mode is one of (0) "intra not coded" mode, (1) "intra coded" mode, (2) "inter not coded" mode and (3) "inter coded" mode;

means for, if the coding mode for P-VOP in the enhancement layer is one of "intra not coded" mode and "intra coded" mode, restoring pixels in a block of the enhancement layer (which is referred to as "an enhancement layer block") based on the coding mode; and means for, if the coding mode for B-VOP is one of "intra not coded" mode, "intra coded" mode, "inter not coded" mode and "inter coded" mode, decoding the block of the enhancement layer based on the coding mode.

19. The apparatus as recited in claim 18, wherein "intra not coded" mode means that the number of pixels in each enhancement layer block different from pixels of the lower layer is less than a reference value, in the case of "intra not coded" mode, the enhancement layer block is decoded based on a spatial prediction method, wherein in case of "intra coded" mode, the enhancement layer block is decoded based on a intra mode CAE method, wherein "inter not coded" mode and "inter coded" mode, no motion vector is decoded for prediction of the enhancement layer block and the motion vector of blocks of the lower layer is utilized, wherein "inter not coded" mode means that the number of pixels in each enhancement layer block predicted from a previous video object plane (VOP) different from pixels of a current VOP is less than a reference value, and in the case of "inter not coded" mode, a current block of the enhancement layer block is decoded based on a temporal prediction method, and wherein in case of "inter coded" mode, the current block of the enhancement layer is decoded based on a inter mode CAE method.

20. The apparatus as recited in claim 18, wherein the additional information for B-VOP in the enhancement layer has a value described in a table as:

|  |  | Enhancement Layer Mode | | | |
|---|---|---|---|---|---|
|  |  | (0) | (1) | (2) | (3) |
| Lower | (0) | 1 | 01 | 001 | 000 |
| Layer | (1) | 110 | 0 | 10 | 111 |
| Mode | (2) | 001 | 01 | 1 | 000 |
|  | (3) | 110 | 0 | 111 | 10. |

21. The apparatus as recited in claim 20, wherein the coding modes (0), (1), (2) and (3) of the lower layer, in case they are the coding modes of the base layer, are respectively mapped as follows:

(0) all_0 or all_255

(1) intraCAE (2) MVDs==0 && No Update or MVDs!=0 && No Update (3) interCAE && MVDs==0 or interCAE && MvDs!=0.

22. The apparatus as recited in claim 18, wherein the additional information for P-VOP in the enhancement layer has a value described in a table as:

| Coding mode | Code |
|---|---|
| "intra not coded" | 1 |
| "intra coded" | 01 |

\* \* \* \* \*